(12) United States Patent
Fuchie et al.

(10) Patent No.: US 8,270,745 B2
(45) Date of Patent: Sep. 18, 2012

(54) IMAGE PROCESSING DEVICE AND IMAGE PROCESSING METHOD

(75) Inventors: Takaaki Fuchie, Kanagawa (JP); Shojiro Shibata, Kanagawa (JP); Kashu Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 12/673,237

(22) PCT Filed: Jun. 23, 2009

(86) PCT No.: PCT/JP2009/061806
§ 371 (c)(1),
(2), (4) Date: Feb. 12, 2010

(87) PCT Pub. No.: WO2009/157580
PCT Pub. Date: Dec. 30, 2009

(65) Prior Publication Data
US 2011/0200266 A1      Aug. 18, 2011

(30) Foreign Application Priority Data

Jun. 27, 2008 (JP) ................................. 2008-169394

(51) Int. Cl.
*G06K 9/36* (2006.01)
*G06K 9/46* (2006.01)
*G06K 9/38* (2006.01)
*H04B 1/66* (2006.01)

(52) U.S. Cl. .................... 382/251; 375/240.03
(58) Field of Classification Search .......... None
See application file for complete search history.

(56) References Cited

U.S. PATENT DOCUMENTS

| | | | |
|---|---|---|---|
| 5,073,820 A | 12/1991 | Nakagawa et al. | |
| 5,245,427 A | * 9/1993 | Kunihiro | .................... 348/400.1 |
| 5,604,494 A | 2/1997 | Murakami et al. | |
| 5,612,900 A | 3/1997 | Azadegan et al. | |

(Continued)

FOREIGN PATENT DOCUMENTS

CN         1195943         10/1998
(Continued)

OTHER PUBLICATIONS

Final Office Action issued on Dec. 9, 2011 in related U.S. Appl. No. 12/207,611.

(Continued)

*Primary Examiner* — Li Liu
(74) *Attorney, Agent, or Firm* — Frommer Lawrence & Haug LLP; William S. Frommer

(57) ABSTRACT

The present invention can realize an image processing device and an image processing method that enable a simplified circuit configuration. An image encoding device (200) encodes an input image (91) in an ordinary process that is the same as main encoding on the basis of a predictive quantization parameter (QPd), while encoding the input image (91) in a simple manner (simplified process) on the basis of the predictive quantization parameter (QPd) and quantization parameters (QP) approximate to the predictive quantization parameter (QPd). The image encoding device (200) calculates a code quantity ratio R_reduction between a high-precision generated code quantity obtained through an ordinary process based on the predictive quantization parameter (QPd) and a generated code quantity obtained through a simplified process based on the predictive quantization parameter (QPd). The image encoding device (200) calculates high-precision generated code quantities based on the quantization parameters (QP) approximate to the predictive quantization parameter (QPd) on the basis of the code quantity ratio R_reduction and generated code quantities obtained through a simplified process based on the quantization parameters (QP) approximate to the predictive quantization parameter (QPd).

10 Claims, 11 Drawing Sheets

U.S. PATENT DOCUMENTS

| | | | |
|---|---|---|---|
| 5,703,646 | A | 12/1997 | Oda |
| 5,721,589 | A | 2/1998 | Murata |
| 5,838,826 | A * | 11/1998 | Enari et al. ............... 382/234 |
| 5,870,145 | A * | 2/1999 | Yada et al. ............ 375/240.04 |
| 5,933,532 | A | 8/1999 | Mihara |
| 6,052,488 | A | 4/2000 | Takahashi et al. |
| 6,100,931 | A | 8/2000 | Mihara |
| 6,163,573 | A | 12/2000 | Mihara |
| 6,337,879 | B1 | 1/2002 | Mihara et al. |
| 6,438,167 | B1 * | 8/2002 | Shimizu et al. ......... 375/240.03 |
| 6,493,384 | B1 | 12/2002 | Mihara |
| 6,678,322 | B1 | 1/2004 | Mihara |
| 6,934,330 | B2 | 8/2005 | Sugiyama et al. |
| 7,286,715 | B2 | 10/2007 | Togashi et al. |
| 7,313,184 | B2 | 12/2007 | Mihara |
| RE40,679 | E | 3/2009 | Oda |
| 7,885,471 | B2 | 2/2011 | Segall |
| 2003/0016878 | A1 * | 1/2003 | Motosu et al. .............. 382/251 |
| 2005/0180505 | A1 | 8/2005 | Ogawa et al. |
| 2005/0259730 | A1 | 11/2005 | Sun |
| 2006/0062481 | A1 | 3/2006 | Suvanto |
| 2006/0171460 | A1 * | 8/2006 | Masuda et al. ......... 375/240.03 |
| 2007/0201553 | A1 * | 8/2007 | Shindo .................. 375/240.03 |
| 2008/0279275 | A1 * | 11/2008 | Suzuki .................. 375/240.03 |
| 2009/0067738 | A1 | 3/2009 | Fuchie et al. |
| 2010/0098173 | A1 | 4/2010 | Horiuchi et al. |
| 2010/0118971 | A1 * | 5/2010 | Tanida et al. .......... 375/240.23 |
| 2010/0135386 | A1 * | 6/2010 | Shibata et al. ......... 375/240.03 |
| 2010/0266047 | A1 | 10/2010 | Takahashi et al. |
| 2011/0090960 | A1 | 4/2011 | Leontaris et al. |
| 2011/0103480 | A1 | 5/2011 | Dane |
| 2011/0188769 | A1 | 8/2011 | Fuchie et al. |
| 2011/0200266 | A1 | 8/2011 | Fuchie et al. |

FOREIGN PATENT DOCUMENTS

| | | |
|---|---|---|
| CN | 1241336 | 1/2000 |
| CN | 1642285 | 7/2005 |
| EP | 0 871 333 | 10/1998 |
| EP | 0 892 561 | 1/1999 |
| EP | 1 555 831 | 7/2005 |
| EP | 2 028 865 | 2/2009 |
| JP | 4 114585 | 4/1992 |
| JP | 4 135427 | 5/1992 |
| JP | 6 350985 | 12/1994 |
| JP | 7 123273 | 5/1995 |
| JP | 7 322252 | 12/1995 |
| JP | 8 65677 | 3/1996 |
| JP | 8 115205 | 5/1996 |
| JP | 9-247675 | 9/1997 |
| JP | 10 23413 | 1/1998 |
| JP | 10 174098 | 6/1998 |
| JP | 10 341435 | 12/1998 |
| JP | 11 98502 | 4/1999 |
| JP | 2000 261805 | 9/2000 |
| JP | 2000 270323 | 9/2000 |
| JP | 3264043 | 12/2001 |
| JP | 3358620 | 10/2002 |
| JP | 2002 359853 | 12/2002 |
| JP | 2004 7475 | 1/2004 |
| JP | 2004 56680 | 2/2004 |
| JP | 3561962 | 6/2004 |
| JP | 2005 203905 | 7/2005 |
| JP | 2006 67302 | 3/2006 |
| JP | 2006 222555 | 8/2006 |
| JP | 2007 158430 | 6/2007 |
| KR | 10-0264710 | 9/2000 |
| KR | 10-2005-0074286 | 7/2005 |
| WO | WO 98/26602 | 6/1998 |
| WO | WO 99 07158 | 2/1999 |
| WO | WO 2008 065814 | 6/2008 |

OTHER PUBLICATIONS

Non-Final Office Action issued on Aug. 25, 2011 in related U.S Appl. No. 12/207,611.

Viscito E, et al.: "A Video Compression Algorithm with AdaptiveBit Allocation and Quantization", Visual Communication and Image Processing '91: Visual Communication. Boston, Nov. 11-13, 1991; [Proceedings of SPIE], Bellingham, SPIE, US, vol. 1605 Part 01/02, Nov. 11, 1991, pp. 58-72, XP000479218.

Office Action issued in corresponding Chinese patent application No. 200810212084.X on Feb. 24, 2010 and its English translation.

Joint Final Committee Draft (JFCD) of Joint Video Specification (ITU-T Rec. H. 264 / ISO/IEC 14496-10 AVE) (JVT-D157), [online], ITU-T / ISO/IEC, Jul. 22, 2002, URL:http://wftp3.itu.int/av-arch/jvt-site/2002_07_Klagenfurt/JVT-D157.zip, p. i, 83-90.

\* cited by examiner

IMAGE PROCESSING DEVICE AND IMAGE PROCESSING METHOD

TECHNICAL FIELD

The present invention relates to, for example, an image encoding device or the like, and specifically relates to a technical field of adjusting a generated code quantity to a target code quantity given to one picture without executing intra-screen feedback control.

BACKGROUND ART

Conventionally, in a system or the like for transmitting a bit stream of moving images or recording the bit stream on a recording medium, high-efficiency encoding is performed to efficiently use a transmission path or recording capacity. In an image encoding device for realizing the high-efficiency encoding, the encoding bit rate of a bit stream generated by an encoder is set to a certain rate according to the transfer rate of a transmission medium. Under this restriction, the quantity of data to be generated, i.e., the quantization step of quantization in the encoder, is controlled. That is, the quantization step is increased to suppress the quantity of data to be generated when images having a complicated picture pattern continue, for example, whereas the quantization step is decreased to increase the quantity of data to be generated when images having a simple picture pattern continue, whereby a fixed rate is maintained to prevent overflow or underflow of a buffer memory.

Therefore, in the image encoding device according to such a related art, the quantization step increases to degrade image quality when complicated images continue, whereas the quantization step decreases when simple images continue, so that uniform image quality cannot be obtained as a whole. In view of this problem, for example, Patent Document 1 discloses an image encoding device that calculates an assigned code quantity to be assigned to each GOP (Group Of Pictures) itself in accordance with the ratio between difficulty in encoding of each GOP and the total sum of difficulties in encoding of a plurality of GOPs so that a large quantity is assigned to a GOP including an image having a complicated picture pattern and that a small quantity is assigned to a GOP including an image having a simple picture pattern.

On the other hand, as a method for adjusting a generated code quantity to a target code quantity given to one picture, step 2 of TM5 (test model 5) is well known, for example. In this method, a code quantity assigned to a picture is evenly distributed to macro blocks (MBs), each distributed quantity being set as a target code quantity of each MB, and adjustment to the target code quantity is performed through feedback control in the picture.

Patent Document 1: Japanese Patent No. 3358620

However, in the above-described method of step 2 of TM5, degradation of image quality may occur in encoding of a picture at the top of a sequence or a picture just after change of a scene because the initial value of the quantization step does not conform to the pattern of the picture.

For example, in a case where the quantization step in a portion before feedback control follows the picture pattern is too large, the image quality of the portion is degraded compared to the other portion. In a case where the quantization step is too small, too much code quantity is used in the portion and the influence thereof may be exerted on the other portion.

Also, since the target code quantity of an MB is always kept constant, inappropriate distribution of code quantity occurs when difficulty of an image is uneven in a screen. In these circumstances, an image encoding device should desirably predict a generated code quantity by executing encoding in parallel in advance and adjust the generated code quantity to a target code quantity given to one picture without executing intra-screen feedback control. However, if the image encoding device executes quantization in parallel in accordance with the number of quantization parameters, the circuit scale increases disadvantageously.

DISCLOSURE OF INVENTION

In order to solve the foregoing problems, in an image processing device according to the present invention, there are provided a predictive quantization factor determining unit configured to determine a predictive quantization factor that is predicted to be approximate to a basic quantization factor with which a generated code quantity obtained by encoding an input image is predicted to be the most approximate to a target code quantity, a simplified encoding unit configured to encode the input image in a simpler manner than the encoding on the basis of the predictive quantization factor and quantization factors approximate to the predictive quantization factor, thereby calculating a generated code quantity obtained through simplified encoding, an encoding unit configured to encode the input image on the basis of the predictive quantization factor, thereby calculating a generated code quantity obtained through encoding, a code quantity ratio calculating unit configured to calculate a code quantity ratio of a generated code quantity that is calculated by the encoding unit and that is based on the predictive quantization factor to a generated code quantity that is calculated by the simplified encoding unit and that is based on the predictive quantization factor, and a correcting unit configured to multiply the code quantity ratio by generated code quantities that are calculated by the simplified encoding unit and that are based on the quantization factors approximate to the predictive quantization factor, thereby correcting the generated code quantities based on the quantization factors approximate to the predictive quantization factor.

Accordingly, the image processing device may execute calculation of a generated code quantity obtained through encoding only for the predictive quantization factor, and execute calculation of generated code quantities obtained through simplified encoding for the quantization factors approximate to the predictive quantization factor.

Also, in an image processing method according to the present invention, there are provided a predictive quantization factor determining step of determining a predictive quantization factor that is predicted to be approximate to a basic quantization factor with which a generated code quantity obtained by encoding an input image is predicted to be the most approximate to a target code quantity, a simplified encoding step of encoding the input image in a simpler manner than the encoding on the basis of the predictive quantization factor and quantization factors approximate to the predictive quantization factor, thereby calculating a generated code quantity obtained through simplified encoding, an encoding step of encoding the input image on the basis of the predictive quantization factor, thereby calculating a generated code quantity obtained through encoding, a code quantity ratio calculating step of calculating a code quantity ratio of a generated code quantity that is calculated by the encoding unit and that is based on the predictive quantization factor to a generated code quantity that is calculated in the simplified encoding step and that is based on the predictive quantization factor, and a correcting step of multiply the code quantity ratio by generated code quantities that are calculated in the simplified encoding step and that are based on the quantization factors approximate to the predictive quantization factor, thereby correcting the generated code quantities based on the quantization factors approximate to the predictive quantization factor.

Accordingly, the image processing method may execute calculation of a generated code quantity obtained through encoding only for the predictive quantization factor, and execute calculation of generated code quantities obtained through simplified encoding for the quantization factors approximate to the predictive quantization factor.

According to the present invention, calculation of a generated code quantity obtained through encoding may be executed only for the predictive quantization factor, and calculation of generated code quantities obtained through simplified encoding may be executed for the quantization factors approximate to the predictive quantization factor. Accordingly, the present invention can realize an image processing device and an image processing method that enable a simplified circuit configuration.

BEST MODES FOR CARRYING OUT THE INVENTION

Figure 1:
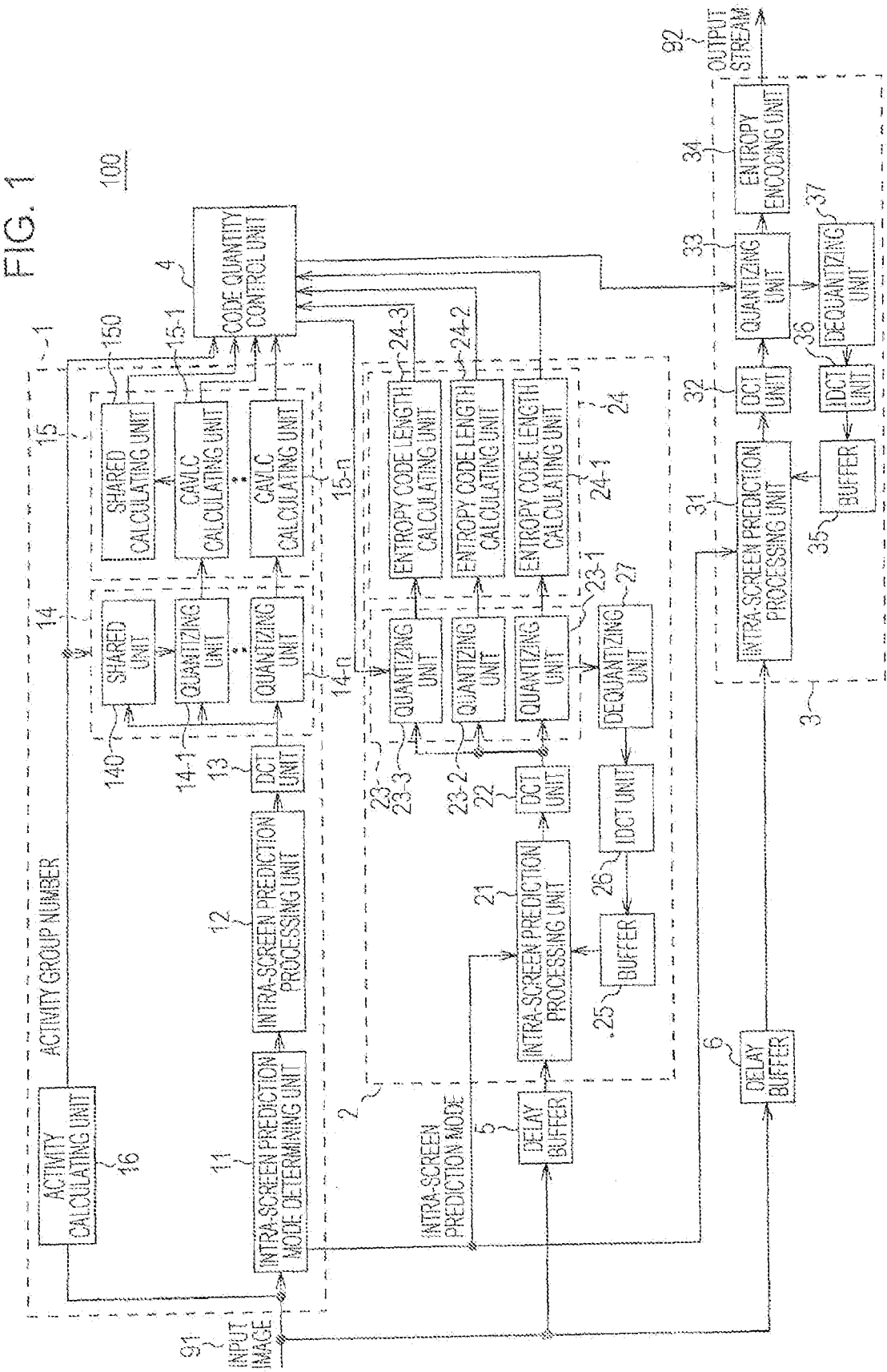
FIG. 1 is a configuration diagram of an image encoding device according to a first embodiment of the present invention.

Hereinafter, the best modes for carrying out the invention (hereinafter simply referred to as embodiments) will be described in detail with reference to the drawings. The description will be given in the following order.
1. First embodiment (partial sharing of a quantizing unit and a CAVLC calculating unit)
2. Second embodiment (estimation of high-precision generated code quantity using simplified encoding)
3. Other embodiments
<1. First Embodiment>
[1-1. Configuration of Image Encoding Device]
FIG. 1 illustrates and describes a configuration of an image encoding device 100 according to an embodiment of the present invention.

The image encoding device 100 includes a first pre-encoding unit 1, a second pre-encoding unit 2, a main encoding unit 3, a code quantity control unit 4, and delay buffers 5 and 6.

In order to perform code quantity control, the image encoding device 100 performs pre-encoding in advance using the first pre-encoding unit 1 and the second pre-encoding unit 2, thereby determining main encoding information used in the main encoding unit 3, such as a basic quantization parameter $QP_{MB}$, a predictive quantization matrix Q MatrixD, an intra-screen prediction mode, and an activity group.

At this time, the first pre-encoding unit 1 performs parallel pre-encoding using a wide range of quantization parameters QP, with the precision being slightly decreased and the circuit scale and processing load being suppressed, thereby roughly estimating a predictive quantization parameter QPd for realizing a target code quantity. The second pre-encoding unit 2 performs parallel pre-encoding in a narrow range, with the precision being increased, thereby determining a basic quantization parameter $QP_{MB}$ that is to be used in the main encoding unit 3.

The first pre-encoding unit 1 is a module for performing a first pre-encoding process and includes an intra-screen prediction mode determining unit 11, an intra-screen prediction processing unit 12, a DCT unit 13, a quantizing unit 14, a CAVLC calculating unit 15, and an activity calculating unit 16.

The second pre-encoding unit 2 is a module for performing a second pre-encoding process and includes an intra-screen prediction processing unit 21, a DCT unit 22, a quantizing unit 23, an entropy code length calculating unit 24, a buffer 25, an IDCT (inverse DCT) unit 26, and a dequantizing unit 27.

On the other hand, the main encoding unit 3 is a module for performing main encoding and includes an intra-screen prediction processing unit 31, a DCT unit 32, a quantizing unit 33, an entropy encoding unit 34, a buffer 35, an IDCT unit 36, and a dequantizing unit 37.

The code quantity control unit 4 is a module for performing code quantity control.

In the image encoding device 100, an externally-supplied input image 91 is supplied to the first encoding unit 1 and the delay buffers 5 and 6. The first encoding unit 1 roughly estimates generated code quantities for respective quantization parameters QP. In the first encoding unit 1, the supplied input image 91 is supplied to the activity calculating unit 16 and the intra-screen prediction mode determining unit 11. The activity calculating unit 16 sorts MBs into activity groups in accordance with the complexity of the image. The activity calculating unit 16 supplies activity group numbers to the quantizing unit 14 and the code quantity control unit 4.

When being supplied with the input image 91, the intra-screen prediction mode determining unit 11 executes an intra-screen prediction process on the input image 91 to generate difference image data. Additionally, the intra-screen prediction mode determining unit 11 simplifies the intra-screen prediction process in the first pre-encoding unit 1 by using the input image 91 as a predictive image. The intra-screen prediction mode determining unit 11 determines the intra-screen prediction mode to be used in the main encoding unit 3 on the basis of a generated code quantity of the difference image data and supplies the determined intra-screen prediction mode to the intra-screen prediction processing units 12, 21, and 31.

The intra-screen prediction processing unit 12 generates difference image data from the input image 91 using the intra-screen prediction mode determined by the intra-screen prediction mode determining unit 11 and supplies the difference image data to the DCT unit 13. The DCT unit 13 performs a DCT process on the difference image data, generates DCT coefficients, and supplies, the DCT coefficients to the quantizing unit 14.

The quantizing unit 14 executes quantization in parallel with a plurality of quantization steps using selected quantization parameters QP1 that are discretely selected from among quantization parameters QP composed of 0 to 51. For example, the quantizing unit 14 includes n stages of quantizing units 14-1 to 14-n connected in parallel, and executes a quantization process on the basis of n selected quantization parameters QP1 so as to generate n quantization coefficients. Additionally, the quantizing unit 14 regards the selected quantization parameters QP1 as average quantization parameters BaseQP of the picture and executes quantization by adding an offset according to an activity group number supplied from the activity calculating unit 16. The detailed configuration of the quantizing unit 14 will be described below. The quantizing unit 14 supplies the n quantization coefficients to the CAVLC calculating unit 15.

The CAVLC calculating unit 15 executes a CAVLC process on the respective n quantization coefficients and supplies generated code quantities of respective MBs to the code quantity control unit 4.

Here, in the first pre-encoding unit 1, the input image 91 is used as a predictive image in place of a local decode image in the intra-screen prediction processing unit 12. On the other hand, in the main encoding unit 3, CAVLC and CABAC (Context-Adaptive Binary Arithmetic Coding) are executed as an entropy encoding method while being switched therebetween.

Therefore, the code quantity control unit 4 corrects generated code quantities using a statistical model calculated through statistics in advance. Accordingly, the code quantity control unit 4 can increase the precision of the generated code quantities calculated by the first pre-encoding unit 1. Furthermore, the code quantity control unit 4 calculates generated code quantities based on the quantization parameters other than the selected quantization parameters QP1 with respect to the corrected generated code quantities based on the selected quantization parameters QP1. Hereinafter, the corrected generated code quantities based on the selected quantization parameters QP1 and generated code quantities calculated through interpolation are collectively called low-precision generated code quantities. Accordingly, the code quantity control unit 4 does not need to execute quantization and a CAVLC process on all the quantization parameters QP, so that the circuit configuration of the quantizing unit 14 can be reduced and the processing load can be decreased.

The code quantity control unit 4 selects, as a predictive quantization parameter QPd, a quantization parameter QP in which a low-precision generated code quantity is the most approximate to the target code quantity. This predictive quantization parameter QPd is a rough value based on the low-precision generated code quantities that are calculated by the first pre-encoding unit 1 in a simple manner, and is a value in which it is predicted that a main encoding generated code quantity at main encoding is approximate to the target code quantity. Additionally, in a case where quantization matrixes Q Matrix are adaptively selected, the code quantity control unit 4 generates low-precision generated code quantities for the respective quantization matrixes Q Matrix and selects, as a predictive quantization matrix Q MatrixD, a quantization matrix Q Matrix that includes quantization parameters QP available in the quantization matrix Q Matrix and that has a low-precision generated code quantity approximate to the target code quantity with the smallest slope.

The second pre-encoding unit 2 determines a basic quantization parameter $QP_{mB}$ that is to be used in the main encoding unit 3. In the second pre-encoding unit 2, the input image 91 that is delayed and is supplied from the delay buffer 5 is supplied to the intra-screen prediction processing unit 21. The intra-screen prediction processing unit 21 encodes the input image 91 through intra-screen prediction using an intra-screen prediction mode supplied from the intra-screen prediction mode determining unit 11 to generate difference image data, and supplies the difference image data to the DCT unit 22.

The DCT unit 22 performs a DCT process on the difference image data to generate DCT coefficients and supplies the DCT coefficients to the quantizing unit 23. The quantizing unit 23 includes three stages of quantizing units 23-1, 23-2, and 23-3. The quantizing unit 23 generates quantization coefficients by quantizing the DCT coefficients on the basis of the predictive quantization parameter QPd and quantization parameters QP approximate to the predictive quantization parameter QPd and supplies the quantization coefficients to the entropy code length calculating unit 24. The entropy code length calculating unit 24 encodes the quantization coefficients using the encoding method used in the main encoding unit 3 among CAVLC and CABAC, thereby generating high-precision generated code quantities for the respective quantization parameters QP. On the basis of the high-precision generated code quantities generated by the entropy code length calculating unit 24, the code quantity control unit 4 determines the quantization parameter QP of the high-precision generated code quantity that is the most approximate to the target code quantity to be the basic quantization parameter $QP_{MB}$. The quantizing unit 23 supplies the quantization coefficients generated on the basis of the predictive quantization parameter QPd to the dequantizing unit 27. The dequantizing unit 27 dequantizes the quantization coefficients to generate DCT coefficients and supplies the DCT coefficients to the IDCT unit 26. The IDCT unit 26 performs an IDCT process on the DCT coefficients to generate a local decode image and supplies the image to the buffer 25. The buffer 25 supplies the local decode image to the intra-screen prediction processing unit 21. As a result, the intra-screen prediction processing unit 21 executes an intra-screen prediction process using the local decode image as a predictive image.

The second pre-encoding unit 2 uses the local decode image as a predictive image and executes entropy encoding using the same encoding method as that used in the main encoding unit 3, thereby being capable of calculating high-precision generated code quantities at higher precision than in the first pre-encoding unit 1. Then, on the basis of the high-precision generated code quantities, the code quantity control unit 4 can determine the quantization parameter QP predicted to generate a main encoding generated code quantity that is the most approximate to the target code quantity to be the basic quantization parameter $QP_{MB}$.

In the main encoding unit 3, the input image 91 that is delayed and is supplied from the delay buffer 6 is supplied to the intra-screen prediction processing unit 31. The intra-screen prediction processing unit 31 encodes the input image 91 through intra-screen prediction using an intra-screen prediction mode supplied from the intra-screen prediction mode determining unit 11 to generate difference image data, and supplies the difference image data to the DCT unit 32.

The DCT unit 32 performs a DCT process on the difference image data to generate DCT coefficients and supplies the DCT coefficients to the quantizing unit 23. The quantizing unit 33 quantizes the DCT coefficients on the basis of the basic quantization parameter $QP_{MB}$ to generate quantization coefficients and supplies the quantization coefficients to the entropy code length calculating unit 34. The entropy code length calculating unit 34 performs entropy encoding on the quantization coefficients using either of CAVLC and CABAC and supplies the coefficients as an output stream 92 to an external device.

The quantizing unit 33 supplies the quantization coefficients generated on the basis of the basic quantization parameter $QP_{mB}$ to the dequantizing unit 37. The dequantizing unit 37 dequantizes the quantization coefficients to generate DCT coefficients and supplies the DCT coefficients to the IDCT unit 36. The IDCT unit 36 performs an IDCT process on the DCT coefficients to generate a local decode image and supplies the local decode image to the intra-image prediction processing unit 31 via the buffer 35. The intra-screen prediction processing unit 31 executes an intra-screen prediction process using the local decode image as a predictive image.

In this way, the image encoding device 100 roughly estimates generated code quantities for respective quantization parameters QP as low-precision generated code quantities using the first pre-encoding unit 1, and determines a predictive quantization parameter QPd on the basis of the low-precision generated code quantities. The image encoding device 100 calculates high-precision generated code quantities at high precision using the predictive quantization parameter QPd and quantization parameters QP approximate thereto using the second pre-encoding unit 2. Then, the image encoding device 100 determines a basic quantization parameter $QP_{MB}$ on the basis of the high-precision generated code quantities calculated at high precision and uses the basic quantization parameter $QP_{MB}$ for a main encoding process performed by the main encoding unit 3. Accordingly, the image encoding device 100 can calculate the high-precision generated code quantity in the basic quantization parameter $QP_{MB}$ at high precision without calculating generated code quantities based on all quantization parameters QP due to pre-encoding in two stages: the first pre-encoding unit 1 and the second pre-encoding unit 2. As a result, the image encoding device 100 can determine an appropriate basic quantization parameter $QP_{MB}$ with a simple configuration.

[1-2. Configurations of Conventional Quantizing Unit and CAVLC Calculating Unit]

Now, for deep understanding of the image encoding device 100 according to this embodiment, a description will be given about configurations and operations of a conventional quantizing unit and a conventional CAVLC calculating unit serving as a basis.

Figure 2:
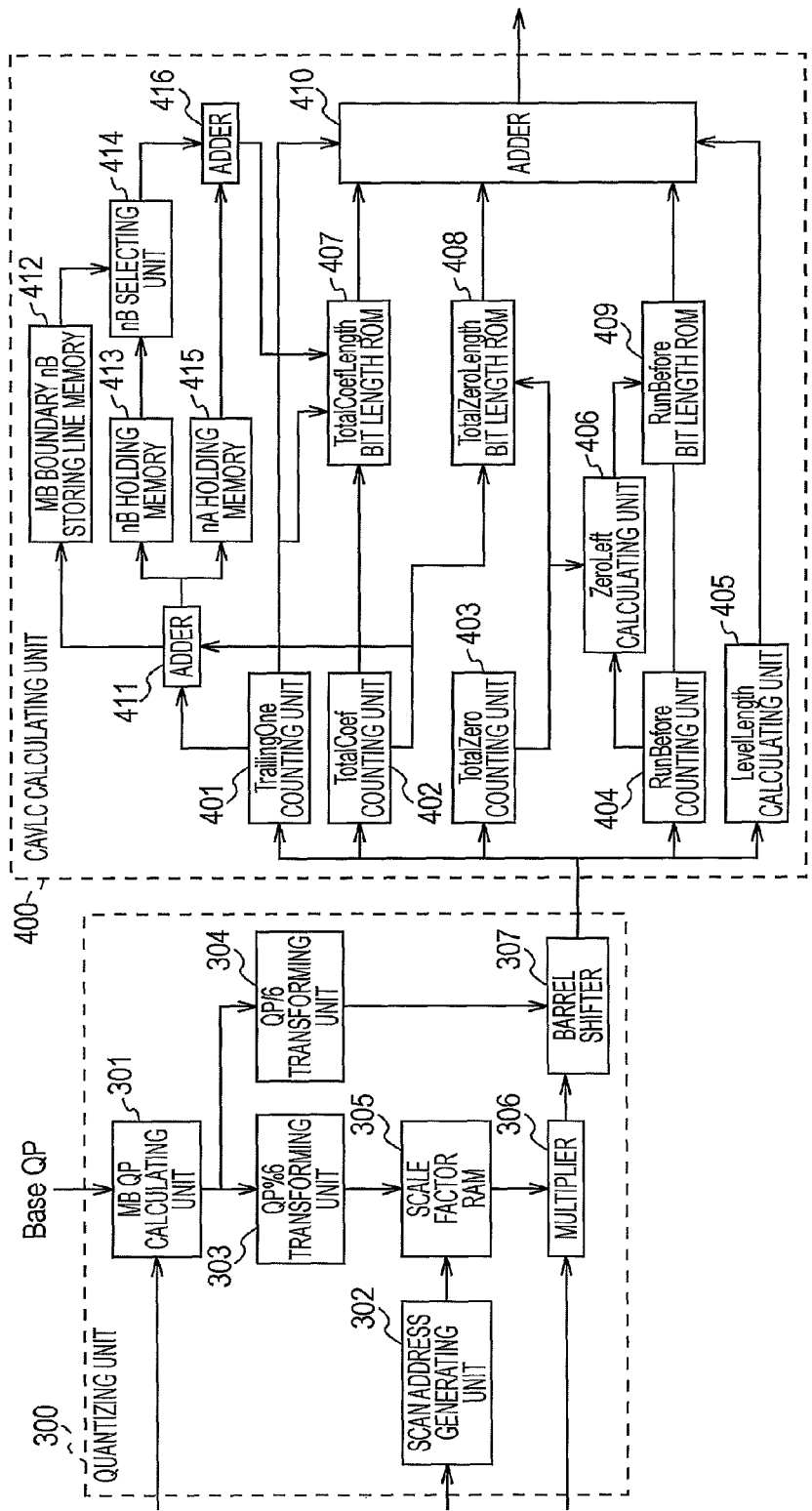
FIG. 2 is a configuration diagram of a quantizing unit and a CAVLC calculating unit of a conventional image encoding device.

FIG. 2 illustrates and describes configurations of a conventional quantizing unit 300 and a conventional CAVLC calculating unit 400. There are arranged quantizing units 300 and CAVLC calculating units 400 the number of which is the same as the number of selected quantization parameters QP1. Each pair of a quantizing unit 300 and a CAVLC calculating unit 400 calculates a generated code quantity based on one selected quantization parameter QP1.

The quantizing unit 300 includes an MB QP calculating unit 301, a scan address generating unit 302, a QP %6 transforming unit 303, a QP/6 transforming unit 304, a scale factor RAM (Random Access Memory) 305, a multiplier 306, and a barrel shifter 307.

On the other hand, the CAVLC calculating unit 400 includes a TrailingOne counting unit 401, a TotalCoef counting unit 402, a TotalZero counting unit 403, a RunBefore counting unit 404, a LevelLength calculating unit 405, a ZeroLeft calculating unit 406, a TotalCoefLength bit length ROM (Read Only Memory) 407, a TotalZeroLength bit length ROM 408, a RunBefore bit length ROM 409, adders 410, 411, and 416, an MB boundary nB storing line memory 412, an nB holding memory 413, an nA holding memory 415, and an nB selecting unit 414.

The quantizing unit 300 calculates a quantization coefficient Z using the following equation with use of a DCT coefficient W and a quantization parameter QP.

$$Z=\{(MF*16/Q\mathrm{Matrix})*W+f\}>>(15+QP/6)$$

Here, MF is a scaling factor calculated from a value defined by a standard of AVC, and f is a rounding factor for determining a round-up or round-down position.

In this configuration, the following signals are input to the quantizing unit 300.

AFF signal indicating whether a macro block has a field structure or a frame structure 8×8/4×4 signal indicating which of 8×8 DCT and 4×4 DCT is to be used for orthogonal transformation Activity group DCT coefficients as a result of DCT Here, "activity group" is supplied as offset information of quantization of respective macro blocks with respect to an average quantization parameter Base QP, which is a base of an entire picture. "DCT coefficients" are supplied in an order appropriate for encoding (e.g., in a reverse order of scan).

The MB QP calculating unit 301 calculates an adaptive quantization parameter QPt, which is obtained by offsetting activities in units of MBs from activity groups and the average quantization parameter Base QP (selected quantization parameter QP1 that is set). The QP %6 transforming unit 303 outputs a remainder generated by dividing the adaptive quantization parameter QPt by "6" (i.e., any of six values of 0, 1, 2, 3, 4, and 5) and supplies the remainder to the scale factor RAM 305 and the QP/6 transforming unit 304.

An AFF signal and an 8×8/4×4 signal are input to the scan address generating unit 302. The scan address generating unit 302 generates DCT addresses indicating the input position of a DCT coefficient on the basis of the AFF signal and the 8×8/4×4 signal and supplies the DCT addresses to the scale factor RAM 305.

The scale factor RAM 305 holds a multiplication coefficient obtained from the following equation.

$$\mathrm{Multiplication\ coefficient}=16\times MF(8\times8/4\times4,QP,h,v)/Q\mathrm{Matrix}(8\times8/4\times4,h,v)$$

Here, h and v are DCT addresses indicating the horizontal and vertical directions in a DCT coefficient, and vary in the range from 0 to 7 in 8×8 and in the range from 0 to 3 in 4×4. MF is a scaling factor, which is a constant parameter defined by H.264. Also, the quantization matrix Q Matrix is a parameter that can be set at an encoder. That is, the scale factor RAM 305 holds a value calculated by multiplying a DCT block size (8×8/4×4), the value of the adaptive quantization parameter QPt, and the scaling factor MF that changes in accordance with DCT addresses by "16" and dividing the product by the quantization matrix Q Matrix (MF*16/Q Matrix). The scale factor RAM 305 outputs a multiplication coefficient having an adaptive scan position phase to the multiplier 306 on the basis of the DCT addresses.

When supplied with an adaptive quantization parameter QPt from the MB QP calculating unit 301, the QP/6 transforming unit 304 outputs a result of dividing the adaptive quantization parameter QPt by an integer to the barrel shifter 307. The barrel shifter 307 adds "15" to the QP/6 transforming unit 304 to calculate a shift quantity and supplies the shift quantity to the CAVLC calculating unit 400. An output of the quantizing unit 300, which is a result of the multiplier 306 shifted by the barrel shifter 307, is equivalent to that obtained by executing quantization (division).

By receiving the output of the quantizing unit 300, the CAVLC calculating unit 400 calculates a generated code quantity that is obtained when actual encoding is executed.

The CAVLC calculating unit 400 encodes TotalCoef representing the number of nonzero coefficients, TrailingOne and trailing_ones_sign_flag representing the number and sign of coefficients having an absolute value of 1 sequentially arranged at the last, level representing the value of a DCT coefficient, total_zero representing the number of zero coefficients before the last nonzero coefficient, and run_before representing the number of zeros sequentially arranged before a nonzero DCT coefficient, and calculates the code lengths thereof. At this time, the CAVLC calculating unit 400 executes adaptive encoding on TotalCoef representing the number of nonzero coefficients and TrailingOne representing the number and sign of coefficients having an absolute value of 1 sequentially arranged at the last, in accordance with the state of surrounding 4×4 blocks. The CAVLC calculating unit 400 selects a VLC table for each 4×4 block on the basis of an addition value of TotalCoef and TrailingOne.

The TrailingOne counting unit 401 counts the number of values of 1 or −1 sequentially arranged from the top except zero among input values of 16 samples in a 4×4 block in a reverse scan order, and supplies the number as TrailingOne to the adder 411 and the TotalCoefLength bit length ROM 407. The TotalCoef counting unit 402 counts the number of nonzero coefficients that are not counted by the TrailingOne counting unit 401 and supplies the number as TotalCoef to the adder 411, the TotalCoefLength bit length ROM 407, and the TotalZeroLength bit length ROM 408. The TotalCoefLength bit length ROM 407 adaptively selects VLC tables in units of 4×4 blocks in accordance with a result from the adder 416 to encode TotalCoef and TrailingOne, and supplies the code lengths thereof to the adder 410.

The TotalZero counting unit 403 counts the number of zero coefficients except zeros sequentially arranged at the top and supplies the number as total_zero to the TotalZeroLength bit length ROM 408 and the ZeroLeft calculating unit 406. The TotalZeroLength bit length ROM 408 calculates a code length of total_zero and TotalCoef as the combination thereof and supplies the code length to the adder 410.

The Runbefore counting unit 404 sequentially counts the number of zeros sequentially arranged next to the nonzero coefficients (±1) counted by the TrailingOne counting unit 401 and the number of zeros sequentially arranged next to the nonzero coefficients counted by the TotalCoef counting unit 402, and supplies the numbers to the ZeroLeft calculating unit 406.

The ZeroLeft calculating unit 406 sequentially subtracts sequential numbers of zerorun of the Runbefore counting unit 404 from total_zero of the TotalZero counting unit 403, thereby accumulating Zero Left, which is the number of remaining zeros. The Runbefore bit length ROM 409 obtains a code length for encoding Runbefore as a combination of Zero Left and Runbefore.

Then, the LevelLength calculating unit 405 calculates the code length of nonzero DCT coefficients.

Adaptive selection of VLC tables in the TotalCoefLength bit length ROM 407 is executed on the basis of TotalCoef and TrailingOne. The adder 411 adds TrailingOne supplied from the TrailingOne counting unit 401 and TotalCoef supplied from the TotalCoef counting unit 402 to calculate the total number of nonzero coefficients. A VLC table is selected on the basis of the number nA of nonzero coefficients in a left-adjoining 4×4 block and the number nB of nonzero coefficients in an upper-adjoining 4×4 block. The adder 411 accumulates the numbers of nonzero coefficients in necessary 4×4 blocks in the nB holding memory 413 and the nA holding memory 415 in order to refer to the numbers as nA and nB.

Also, MBs are sequentially supplied in a line direction and 4×4 blocks are scanned in a predetermined order (raster scan order in an 8×8 sub-block) in the MBs. Therefore, a left-adjoining 4×4 block is scanned almost immediately previously. Likewise, an upper-adjoining block in an MB is scanned almost immediately previously. However, in a 4×4 block at the upper end of an MB, it is necessary to refer to a 4×4 block at the lowermost end in an MB in the preceding line in order to refer to an upper-adjoining block. Therefore, the adder 411 accumulates the values for macro block lines in the MB boundary nB storing line memory 412. On the basis of the address of a 4×4 block in an MB, the nB selecting unit 414 selects nB that is positioned at an upper portion and that is held in the MB boundary nB storing line memory 412 in a case of an upper boundary, and selects nB that is positioned at an upper portion from the nB holding memory 413 in the other cases. Then, the adder 416 regards an average value of nonzero coefficients in left-adjoining and upper-adjoining 4×4 blocks as a table selection index nC and calculates the table selection index nC in accordance with the following equation.

$$nC = (nA + nB)/2$$

Then, the adder 410 adds the values supplied from the TrailingOne counting unit 401, the TotalCoefLength bit length ROM 407, the TotalZeroLength bit length ROM 408, the RunBefore bit length ROM 409, and the LevelLength calculating unit 405, thereby obtaining the total sum of code lengths.

The above-described process is repeatedly performed on an entire picture in units of 4×4 blocks, so that a low-precision generated code quantity of the picture corresponding to the average quantization parameter Base QP is obtained. This process of obtaining the low-precision generated code quantity of the picture is performed in 15 stages in parallel by using different discretely-selected quantization parameters QP1 as average quantization parameters Base QP, and is performed for respective quantization matrixes Q Matrix.

[1-3. Configurations of Quantizing Unit and CAVLC Calculating Unit According to this Embodiment]

Figure 3:
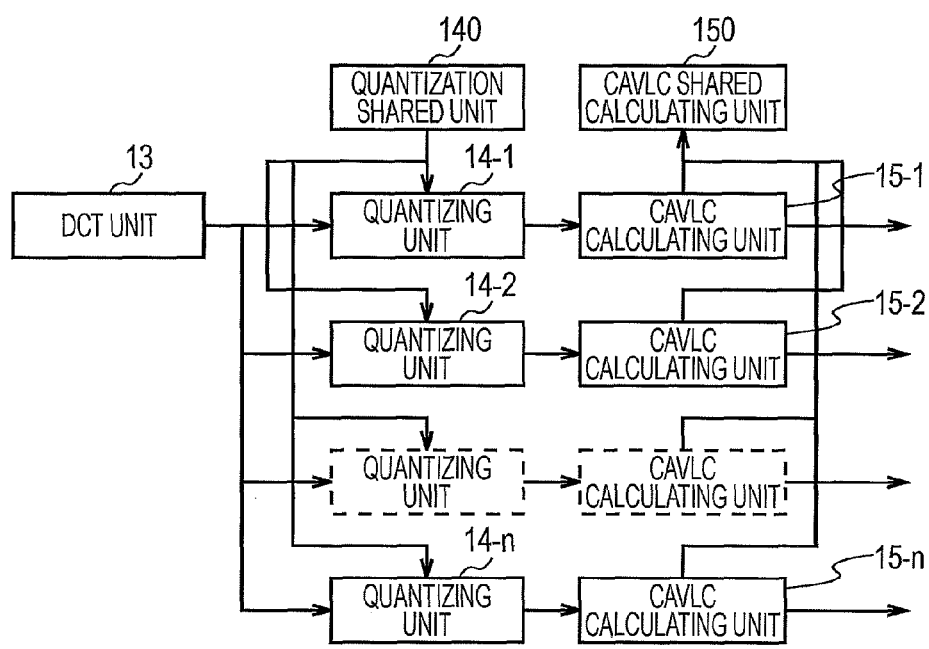
FIG. 3 is a diagram illustrating a basic configuration of a quantizing unit and a CAVLC calculating unit.
Figure 4:
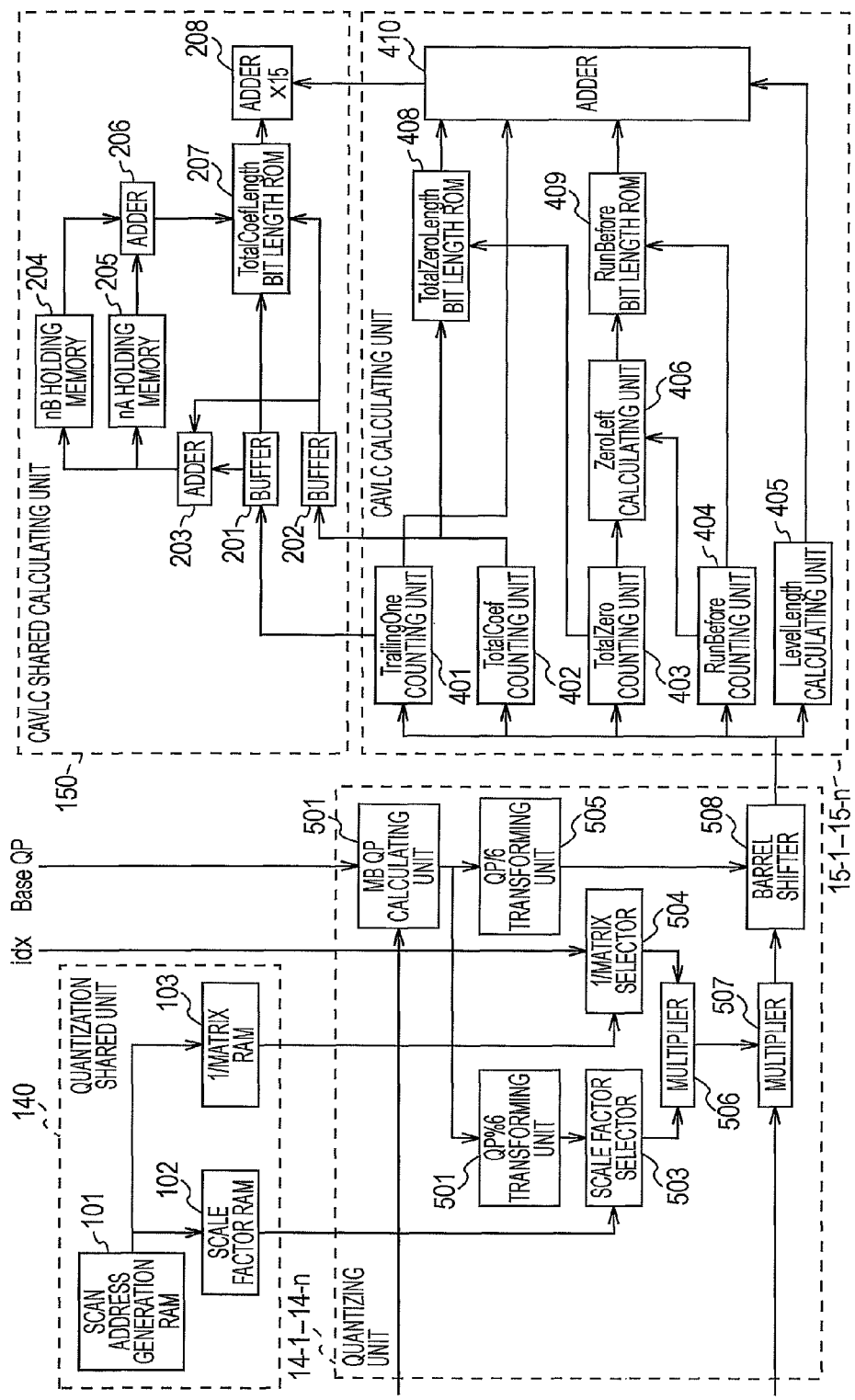
FIG. 4 is a configuration diagram specifically illustrating a configuration of a quantizing unit and a CAVLC calculating unit of the image encoding device according to the first embodiment of the present invention.
Figure 5:
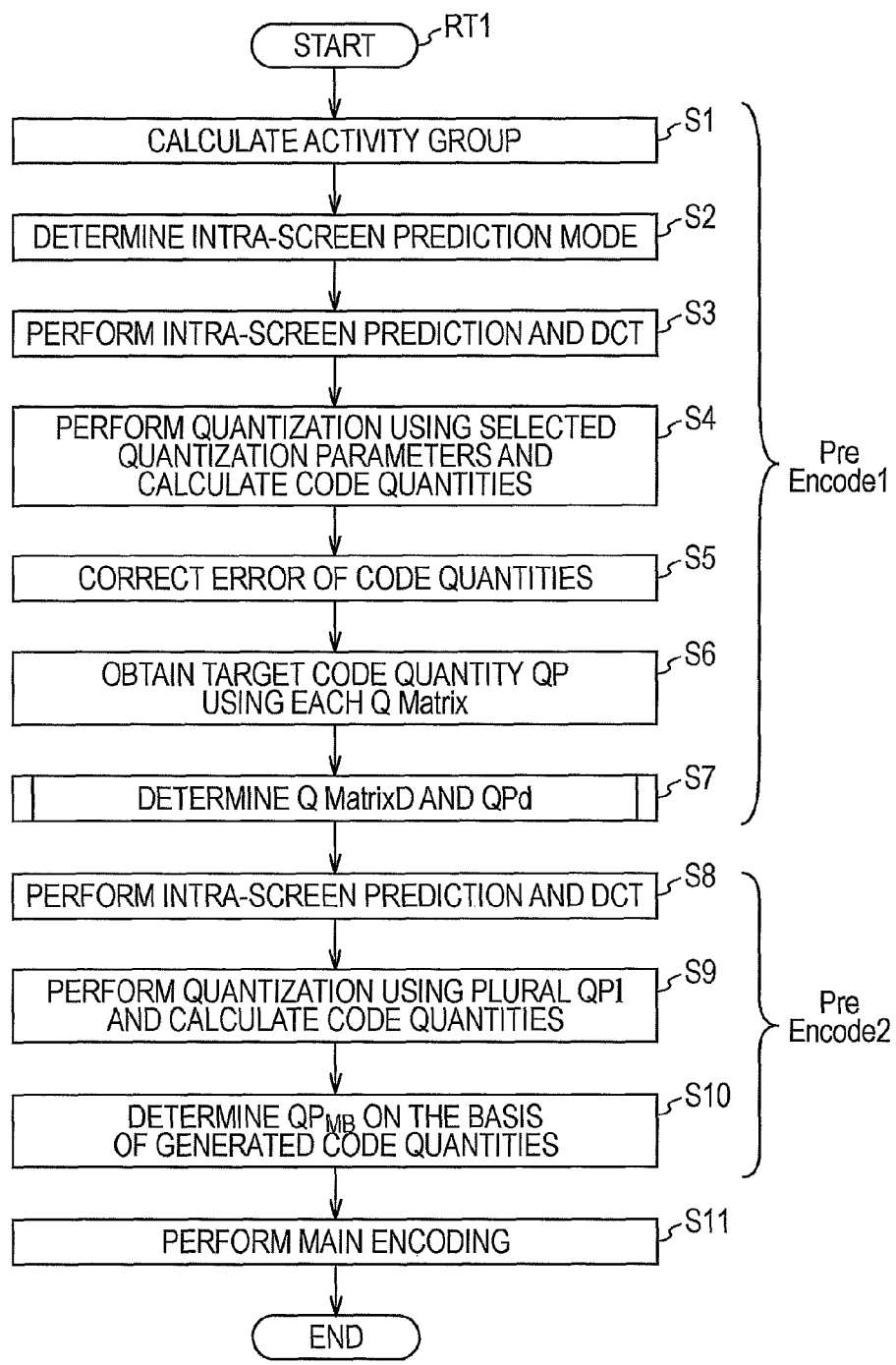
FIG. 5 is a flowchart specifically explaining an encoding process procedure performed by the image encoding device.
Figure 6:
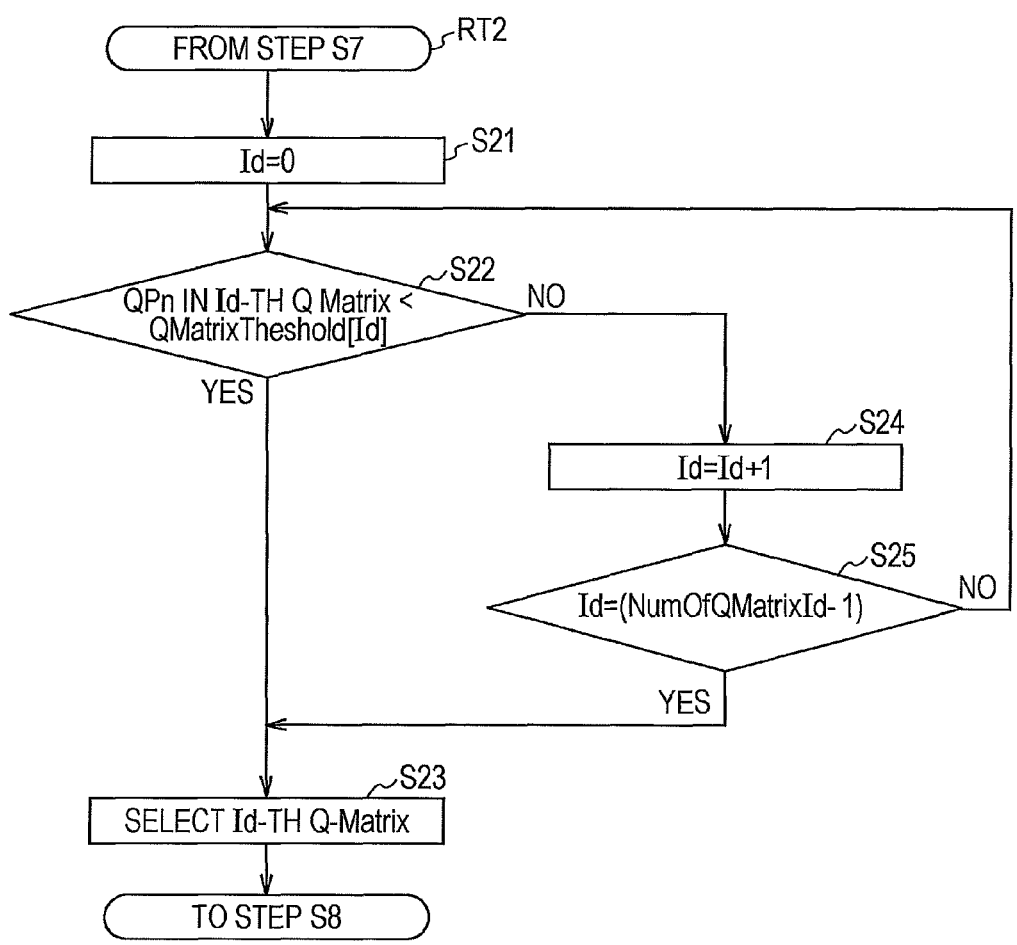
FIG. 6 is flowchart further explaining a switching process of an adaptive Q Matrix.

FIGS. 3 and 4 illustrate and describe an extracted part of the configuration of the image encoding device 100 according to an embodiment of the present invention, with a characteristic process being added to the configuration illustrated in FIG. 2 described above. Note that the parts corresponding to those in the conventional CAVLC calculating unit 400 illustrated in FIG. 2 are denoted by the same reference numerals and that a description about the same parts will be omitted.

The image encoding device 100 and image encoding method according to this embodiment have the following characteristics.

In a case where a generated code quantity is predicted in a preprocess using an image compression method represented by H.264/AVC (Advanced Video Coding: advanced moving image compression coding standard) or the like, a process is simplified when quantization is performed in parallel in different quantization steps to calculate a code length, whereby hardware is reduced. This configuration has the following three characteristics.

A CAVLC shared calculating unit 150 of the CAVLC calculating unit 15 calculates a code quantity without using the number nB of nonzero coefficients in a 4×4 block at the upper end of an MB, whereby a line memory is reduced.

A CAVLC shared calculation process in which computation is performed in units of 4×4 blocks is shared in a time-sharing manner, whereby a logical module such as a code-length transform memory is reduced.

A selection process and a quantization process of scaling factors and quantization matrixes Q Matrix are separated by a quantization shared unit 140, so that a memory is shared and the memory is reduced.

FIG. 3 illustrates configurations of the quantizing unit 14 and the code-length calculating unit 15. The quantizing unit 14 is provided with quantizing units 14-1 to 14-$n$ in parallel, the number of which is the same as the number of selected quantization parameters QP1, and the quantization shared unit 140 shared by the quantizing units 14-1 to 14-$n$ is connected to each of the quantizing units 14-1 to 14-$n$. Likewise, the CAVLC calculating unit 15 is provided with CAVLC calculating units 15-1 to 15-$n$ in parallel, the number of which is the same as the number of selected quantization parameters QP1, and the CAVLC shared calculating unit 150 shared by the CAVLC calculating units 15-1 to 15-$n$ is connected to each of the CAVLC calculating units 15-1 to 15-$n$.

FIG. 4 is a block diagram of a main part for performing quantization and variable-length encoding using a plurality of quantization parameters QP. Note that the operation of the image encoding device 100 is also applied to the image encoding method according to this embodiment.

As illustrated in FIG. 4, the quantization shared unit 140 includes a scan address generation RAM 101, a scale factor RAM 102, and a 1/matrix RAM 103.

Each of the quantizing units 14-1 to 14-$n$ includes an MB QP calculating unit 501, a QP %6 transforming unit 502, a scale factor selector 503, a 1/matrix selector 504, a QP/6 transforming ROM 505, multipliers 506 and 507, and a barrel shifter 508.

The CAVLC shared calculating unit 150 includes buffers 201 and 202, an adder 203, an nB holding memory 204, an nA holding memory 205, an adder 206, a TotalCoefLength bit length ROM 207, and an adder 208.

Also, each of the CAVLC calculating units 15-1 to 15-$n$ includes the TrailingOne counting unit 401, the TotalCoef counting unit 402, the TotalZero counting unit 403, the RunBefore counting unit 404, the LevelLength calculating unit 405, the ZeroLeft calculating unit 406, the TotalZeroLength bit length ROM 408, the RunBefore bit length ROM 409, and the adder 410.

As described above, the image encoding device 100 has a configuration of using the quantization shared unit 140 and the CAVLC shared calculating unit 150 that are shared to reduce the circuit scale of a parallelized process.

In the quantization shared unit 140, the scale factor RAM 102 and the 1/matrix RAM 103 are mainly shared to reduce an SRAM size. In the CAVLC shared calculating unit 150, code-length calculation by the TotalCoefLength bit length ROM 207 may be performed once for a 4×4 block, while other processes are executed in units of pixels, and thus the circuit is shared to perform a time-sharing process.

Also, the CAVLC calculating unit 15 approximately calculates a code quantity under the assumption nB=nA on the MB upper boundary to reduce the MB boundary nB storing line memory 412 illustrated in FIG. 3. Defining nB=nA is an approximation process and is a cause of error, but is within the allowance in a process of predicting a code quantity. Also, a reduction effect of a 15-parallel line memory obtained through this approximation is great.

In this configuration, an AFF signal indicating whether an MB has a field structure or a frame structure and an 8×8/4×4 signal indicating which of 8×8 DCT and 4×4 DCT is to be used for orthogonal transformation are input to the quantization shared unit 140. More specifically, the scan address generation RAM 101 generates DCT addresses indicating an input position of a DCT coefficient upon input of the AFF signal and the 8×8/4×4 signal.

The scale factor RAM 102 outputs a scaling factor MF having an adaptive scan position phase to the scale factor selector 503 of the quantizing unit 500. As described above, a scaling factor MF is selected in accordance with DCT addresses and the value of QP %6 (the remainder generated by dividing a selected quantization parameter QP1 by 6). In the respective quantizing units 14-1 to 14-$n$, selected quantization parameters QP1 different from each other are set as average quantization parameters BaseQP. Therefore, the scale factor RAM 102 outputs all the scaling factors MF corresponding to all six values (QP %6=0, 1, 2, 3, 4, and 5) in accordance with DCT addresses and causes the scale factor selectors 503 in the quantizing units 14-1 to 14-$n$ in the subsequent stage to select the scaling factors MF. Likewise, the 1/matrix RAM 103 outputs, to the 1/matrix selectors 504 of the quantizing units 14-1 to 14-$n$, a reciprocal of a matrix value having an adaptive scan position phase among quantization matrixes Q Matrix. The 1/matrix RAM 103 carries the reciprocal of the matrix value by shift to the left of about 20 bits in order to output the reciprocal of the matrix value.

That is, the quantization matrix Q Matrix to be used changes depending on the value of the selected quantization parameter QP1, and thus a plurality of (e.g., about four types of) quantization matrixes Q Matrix are necessary. The 1/matrix RAM 103 outputs all the types of (four types of) reciprocals of matrix values to the 1/matrix selectors 504 of the quantizing units 14-1 to 14-$n$ and causes the 1/matrix selectors 504 of the quantizing units 14-1 to 14-$n$ in the subsequent stage to select the reciprocals in accordance with the value of the selected quantization parameter QP1 that is set.

Subsequently, in each of the quantizing units 14-1 to 14-$n$, sequentially-supplied DCT coefficients are supplied to the MB QP calculating unit 501. The MB QP calculating unit 501 adds an activity offset according to an activity group to a selected quantization parameter QP1 to generate an adaptive quantization parameter QPt and supplies it to the QP %6 transforming unit 501 and the QP/6 transforming unit 505. The QP %6 transforming unit 501 calculates a QP %6 value, which is a remainder generated by dividing the adaptive quantization parameter QPt by "6", and supplies it to the scale factor selector 503. The scale factor selector 503 selects a scaling factor MF as a first multiplication counting in accordance with the QP %6 value and supplies it to the multiplier 506. The 1/matrix selector 504 selects a reciprocal of a matrix value as a second multiplication counting on the basis of a matrix identification number idx of the quantization matrix Q Matrix to be used and supplies it to the multiplier 506.

The multiplier 506 multiplies the scaling factor MF by "16" and the reciprocal of the matrix value (MF*16/QMatrix). The multiplier 506 performs multiplication of output values of the scale factor selector 503 and the 1/matrix selector 504 and then performs shift to the right of 20 bits so as to achieve matching for carry in the 1/matrix RAM 103, and supplies the multiplication value to the multiplier 507. The multiplier 507 multiplies DCT coefficients in a scan reverse order by the multiplication value and supplies the products to the barrel shifter 508. The QP/6 transforming unit supplies a QP/6 value generated by dividing the adaptive quantization parameter QPt by "6" to the barrel shifter 508. The barrel shifter 508 decreases the digits of the output value of the multiplier 507 by the number of digits according to the QP/6 value, thereby obtaining a quantization result.

In this way, the scale factor RAM and the 1/matrix RAM 103 are shared in the quantizing unit 14, and all scaling factors MF and reciprocals of matrix values that are available in the quantizing units 14-1 to 14-$n$ in the subsequent stage are supplied to the quantizing units 14-1 to 14-$n$ in accordance with DCT addresses. Each of the quantizing units 14-1 to 14-$n$ selects a scaling factor MF in accordance with a selected quantization parameter QP1. Also, each of the quantizing units 14-1 to 14-$n$ selects a reciprocal of a matrix value in accordance with a matrix identification number idx. Accordingly, the scale factor RAM 102 and the 1/matrix RAM 103 can be shared in the quantizing unit 14, so that the capacity of the RAM necessary for the entire quantizing unit 14 can be reduced. Also, the quantizing unit 14 holds scaling factors MF and reciprocals of matrix values separately from each other. Therefore, the storage capacity necessary for the scale factor RAM 102 and the 1/matrix RAM 103 can be reduced compared to a case of holding all values of products of scaling factors MF and reciprocals of matrix values.

The CAVLC calculating unit 15 is different from the conventional CAVLC calculating unit 400 in that the CAVLC shared calculating unit 150 adaptively selects VLC tables and encodes TrailingOne and TotalCoef.

The TrailingOne counting unit 401, the TotalCoef counting unit 402, the TotalZero counting unit 403, the RunBefore counting unit 404, the LevelLength calculating unit 405, the ZeroLeft calculating unit 406, the TotalZeroLength bit length ROM 408, and the RunBefore bit length ROM 409 in each of the CAVLC calculating units 15-1 to 15-$n$ sequentially execute a process on DCT coefficients supplied thereto. That is, the respective units in each of the CAVLC calculating units 15-1 to 15-$n$ execute 4×4=16 times of computation on a 4×4 DCT block. In contrast, the TotalCoefLength bit length ROM 407 only needs to select one VLC table and perform computation once on TrailingOne and TotalCoef calculated for a 4×4 DCT block. That is, the TotalCoefLength bit length ROM 407 needs a computation time of only about one sixteenth relative to the respective units in each of the CAVLC calculating units 15-1 to 15-$n$. Thus, the CAVLC shared calculating unit 150 holds TrailingOnes and TotalCoefs supplied from the CAVLC calculating units 15-1 to 15-$n$ in the buffers 201 and 202, respectively. While the respective units in each of the CAVLC calculating units 15-1 to 15-$n$ execute a process on the next 4×4 block, the CAVLC shared calculating unit 150 adaptively selects a VLC table for the preceding 4×4 block, and sequentially encodes fifteen TrailingOnes and TotalCoefs calculated by the CAVLC calculating units 15-1 to 15-$n$.

In the CAVLC shared calculating unit 150, the outputs of the TrailingOne counting units 401 and the TotalCoef counting units 402 of the 15-parallel CAVLC calculating units 15-1 to 15-$n$ are held in fifteen stages of buffers in each of the buffers 201 and 202.

The adder 203 receives TrailingOnes and TotalCoefs from the buffers 201 and 202 in a time-sharing manner and adds the TrailingOnes and TotalCoefs to calculate the numbers of nonzero coefficients. The nA holding memory 205 holds the number nA of nonzero coefficients of a 4×4 block referred to as a left-adjoining block in a macro block. The nB holding memory 204 holds the number nB of nonzero coefficients of a 4×4 block referred to as an upper-adjoining block in a macro block of 4×4 blocks.

Here, the CAVLC shared calculating unit 150 normally needs to hold nB information of an MB lower boundary and use it as nB information of a 4×4 block on an upper boundary of a lower macro block. However, if a 15-stage line memory for holding nB is arranged in the CAVLC shared calculating unit 150, the storage capacity of the RAM required for the CAVLC shared calculating unit 150 becomes large, which is undesirable in view of the circuit scale. Therefore, when processing a 4×4 block on an MB upper boundary, the CAVLC shared calculating unit 150 performs the same process as a macro block process at the uppermost portion of the screen by equating nB with nA.

That is, in a case where a 4×4 block is on the upper boundary of an MB, the adder 206 sets the table selection index nC to nA. The adder 206 sets nC to nB for a 4×4 block on the left boundary of the screen. In a case other than the foregoing two cases, that is, in a case where a 4×4 block is neither on the upper boundary of an MB nor on the left boundary of the screen, the adder 206 sets nC to (nA+nB)/2. Then, the TotalCoefLength bit length ROM 207 selects a VLC table on the basis of the table selection index nC, encodes TrailingOne and TotalCoef, and calculates the code lengths thereof. As a result, the TotalCoefLength bit length ROM 207 sequentially outputs TotalCoefLength bit lengths to the adder 208. The adder 208 is supplied with the code lengths calculated by the CAVLC calculating units 15-1 to 15-$n$. The adder 208 adds the codes that correspond to the TotalCoefLength bit lengths and that are supplied from the CAVLC calculating units 15-1 to 15-$n$ and the TotalCoefLength bit lengths, thereby calculating the code lengths of respective 4×4 blocks. The code quantity control unit 4 adds the code lengths of the respective 4×4 blocks in units of MBs, thereby calculating generated code quantities of the respective MBs. These processes are repeatedly performed on the entire picture.

In this way, in the CAVLC calculating unit 15, the TotalCoefLength bit length ROM 207, in which the number of computations is small, is shared. Accordingly, in the CAVLC calculating unit 15, the number of TotalCoefLength bit length ROMs 207 can be reduced and the circuit configuration can be simplified. The CAVLC calculating unit 15 sets the table selection index nC to nA in a case where a 4×4 block is on the upper boundary of an MB. Accordingly, an MB boundary nB storing line memory can be omitted in the CAVLC calculating unit 15, the storage capacity of the RAM required for the CAVLC calculating unit 15 can be significantly reduced, and the circuit configuration can be simplified.

According to the above-described image encoding device 100 and image encoding method according to an embodiment, the quantizing unit 14 stores scaling factors MF and 1/Q Matrix separately from each other and supplies all values available in accordance with DCT addresses to the respective quantizing units 14-1 to 14-$n$. Each of the quantizing units 14-1 to 14-$n$ selects a scaling factor MF and a 1/Q matrix in accordance with a quantization parameter QP that is set. Accordingly, in the quantizing unit 14, a memory can be shared by the quantizing units 14-1 to 14-$n$ and thus the memory can be reduced. The CAVLC calculating unit 15 does not use an upper-adjoining 4×4 block at the upper end portion of an MB when selecting a VLC table, so that the MB boundary nB storing line memory 412 can be reduced. Furthermore, in the CAVLC calculating unit 15, the CAVLC shared calculating unit 15 in which computation is executed in units of 4×4 DCT blocks is shared in a time-sharing manner, so that the logical module can be reduced.

Also, the image encoding device 100 executes pre-encoding twice in units of pictures considering that the advantage of AVC cannot be maximized if the unit of process is small because the efficiency is enhanced by using an intra-screen correlation in AVC. Also, the image encoding device 100 employs a partially-parallel configuration based on partial sharing of the circuit in order to overcome a problem in that a processing quantity increases, resulting in an increase in circuit scale of encoding, for the purpose of increasing efficiency. Accordingly, the image encoding device 100 is capable of causing a generated code quantity to match a target code quantity given to one picture and determining a code quantity distribution in view of a visual characteristic, that is, quantization parameters QP, while simplifying the configuration of pre-encoders.

[1-4. Determination of Basic Quantization Parameter]

The second pre-encoding unit 2 actually executes encoding similar to that of the encoder 3 using a predictive quantization parameter QPd and a predictive quantization matrix Q MatrixD, thereby calculating a high-precision generated code quantity at high precision. Hereinafter, a generated code quantity calculated by the second pre-encoding unit 2 is called a high-precision generated code quantity. At this time, the second pre-encoding unit 2 calculates a high-precision generated code quantity using not only a predictive quantization parameter QPd but also quantization parameters QP before and after the predictive quantization parameter QPd, and predicts a high-precision generated code quantity approximate to the predictive quantization parameter QPd using the fluctuation ratio thereof.

The code quantity control unit 4 supplies the predictive quantization parameter QPd, the predictive quantization matrix Q MatrixD, and activity groups of respective MBs to the second pre-encoding unit 2. The second pre-encoding unit 2 performs second pre-encoding on the basis of those values.

In the second pre-encoding unit 2, the input image 91 is input to the intra-screen prediction processing unit 21 after being delayed via the delay buffer 5. The intra-screen prediction processing unit 21 calculates a difference between a predictive image and the input image 91 to generate difference image data. Then, the DCT unit 22 executes a DCT process on the difference image data to generate DCT coefficients. The quantizing unit 23 executes a quantization process on the DCT coefficients to generate quantization coefficients. The entropy code length calculating unit 24 performs entropy encoding on the quantization coefficients using CAVLC or CABAC to calculate high-precision generated code quantities.

Additionally, during the process in the second pre-encoding unit 2, the quantizing unit 23 transmits quantization coefficients to the dequantizing unit 27. The dequantizing unit 27 dequantizes the quantization coefficients to reproduce DCT coefficients. Then, the IDCT unit 26 performs IDCT on the DCT coefficients to generate a local decode image, which is stored in the buffer 25.

Here, the quantizing unit 23 is constituted by three stages of quantizing units 23-1, 23-2, and 23-3 in this example, and the entropy code length calculating unit 24 is constituted by three stages of entropy code length calculating units 24-1, 24-2, and 24-3 in this example. The reason why the number of stages is small (three) is that quantization parameters QP have already been roughly estimated in a wide range in the first pre-encoding.

Under such a configuration, the quantizing unit 23 and the entropy code length calculating unit 24 execute a process in parallel so as to obtain high-precision generated code quantities corresponding to the predictive quantization parameter QPd and quantization parameters QP before and after the predictive quantization parameter QPd. At this time, the entropy code length calculating unit 24 selects the same method as the entropy encoding method of main encoding performed by the main encoding unit 3 from among CABAC/CAVLC.

Subsequently, the code quantity control unit 4 determines a basic quantization parameter $QP_{MB}$ of a picture that is to be used for main encoding on the basis of the high-precision generated code quantities obtained through the second pre-encoding. Then, the code quantity control unit 4 transmits quantization information (Q Matrix, QP of each MB, etc.) based on the determined basic quantization parameter $QP_{MB}$ of a picture, a predictive quantization matrix Q MatrixD, and an activity group of each MB to the main encoding unit 3.

More specifically, in a case where a target code quantity is sandwiched by the high-precision generated code quantities obtained through the second pre-encoding, that is, in a case where $$\text{Generated\_bits}(QP\_\text{precode1}+1) \leq \text{Target\_bits} \leq \text{Generated\_bits}(QP\_\text{Precode1}-1)$$

is satisfied, the quantization parameter QP that is the most approximate to the target code quantity is selected as the basic quantization parameter $QP_{MB}$.

Otherwise, the code quantity control unit 4 obtains, from the result of the second pre-encoding, the fluctuation ratio of high-precision generated code quantities with respect to a change in quantization parameter QP. The predictive quantization parameter QPd is calculated on the basis of the low-precision generated code quantities obtained by the first pre-encoding unit 1. Thus, the quantization parameter QP that is the most approximate to the target code quantity exists near the predictive quantization parameter QPd. In a case where the values of quantization parameters QP are approximate to each other, the fluctuation ratio of generated code quantities is substantially constant. Then, the code quantity control unit 4 predicts the high-precision generated code quantities corresponding to the respective quantization parameters QP on the basis of the fluctuation ratio of the high-precision generated code quantities corresponding to the predictive quantization parameter QPd and the quantization parameters QP before and after the predictive quantization parameter QPd, and selects the quantization parameter QP that is the most approximate to the target code quantity as the basic quantization parameter $QP_{MB}$.

First, DiffRatio_1, which represents how many percentages a high-precision generated code quantity changes when "1" is subtracted from a quantization parameter QP, is obtained from the result of the second pre-encoding unit 2 in the following manner. Note that Generated_bits represents a generated code quantity in the second pre-encoding unit 2, that QP_precode1 represents a predictive quantization parameter QPd, and that QP_precode1−1 represents a quantization parameter QP that is smaller than the predictive quantization parameter QPd by "1".

$$\text{DiffRatio}\_1 = (\text{Generated\_bits}(QP\_\text{precode1}-1) - \text{Generated\_bits}(QP\_\text{precode1}))/\text{Generated\_bits}(QP\_\text{precode1})$$

DiffRatio_2, which represents how many percentages a high-precision generated code quantity changes when "1" is added to a quantization parameter QP, is obtained from the result of the second pre-encoding unit 2 in the following manner. QP_precode1+1 represents a quantization parameter QP that is larger than the predictive quantization parameter QPd by "1".

$$\text{DiffRatio}\_2 = (\text{Generated\_bits}(QP\_\text{precode1}) - \text{Generated\_bits}(QP\_\text{precode1}+1))/\text{Generated\_bits}(QP\text{precode1}+1)$$

The fluctuation ratio DiffRatio of a high-precision generated code quantity near the predictive quantization parameter QPd is obtained in the following manner.

$$\text{DiffRatio} = (\text{DiffRatio}\_1 + \text{DiffRatio}\_2)/2$$

That is, DiffRatio is calculated as an average value of fluctuation of a generated code quantity when a quantization parameter changes by only "1" in the positive and negative directions from the predictive quantization parameter QPd.

Assume that DeltaQP is an absolute value of the difference between the predictive quantization parameter QPd (QP_precode1) and the quantization parameter QP with which the high-precision generated code quantity is the most approximate to the target code quantity. Then, when the quantization parameter QP corresponding to the high-precision generated code quantity that is the most approximate to the target code quantity is smaller than the quantization parameter QP (QP_precode1−1) that is smaller than the predictive quantization parameter QPd by 1, the high-precision generated code quantity (Generated_bits (QP)) of the quantization parameter QP with which the high-precision generated code quantity is the most approximate to the target code quantity is calculated in the following manner.

$$\text{Generated\_bits}(QP) = \text{Generated\_bits}(QP\_precode1-1) \times (1.0 + \text{DiffRatio})^{(\text{Delta}QP-1)}$$

When the quantization parameter QP corresponding to the high-precision generated code quantity that is the most approximate to the target code quantity is larger than the quantization parameter QP (QP_precode1+1) that is larger than the predictive quantization parameter QPd by 1, the high-precision generated code quantity (Generated_bits (QP)) of the quantization parameter QP with which the high-precision generated code quantity is the most approximate to the target code quantity is calculated in the following manner.

$$\text{Generated\_bits}(QP) = \text{Generated\_bits}(QP\_precode1+1) \times (1.0 - \text{DiffRatio})^{(\text{Delta}QP-1)}$$

That is, the code quantity control unit 4 increases/decreases the high-precision generated code quantities obtained when quantization parameters QP before and after the predictive quantization parameter QPd are used by a code quantity according to the fluctuation ratio when the value of the quantization parameter QP changes by "1" with reference to the predictive quantization parameter QPd. The code quantity control unit 4 can calculate high-precision generated code quantities obtained when quantization parameters QP approximate to the predictive quantization parameter QPd are used at high precision.

In the above-described manner, the code quantity control unit 4 selects the quantization parameter QP that is the most approximate to the target code quantity as the basic quantization parameter $QP_{MB}$ used as an average quantization parameter (BaseQP) in main encoding.

As described above, the second pre-encoding unit 2 performs pre-encoding using the predictive quantization parameter QPd (QP_precode1) estimated by the first pre-encoding unit 1, the quantization parameter QP larger by 1 (QP_precode1+1), and the quantization parameter QP smaller by 1 (QP_precode1−1). Here, as described above, only the quantizing unit 23 and the entropy code length calculating unit 24 are parallelized and the other processes are shared to reduce the circuit scale.

At this time, a local decode image used in an intra-screen prediction process is data that is quantized using the predictive quantization parameter QPd (QP_precode1) that is estimated on the basis of the result of the first pre-encoding unit 1. That is, the data processed with dequantization and IDCT is an output of quantization using the predictive quantization parameter QPd (QP_precode1). This means that a local decode image of the predictive quantization parameter QPd (QP_precode1), not an own local decode image, is used as a substitute for an input of an intra-screen prediction process of pre-encoding that uses the quantization parameters QP (QP_precode1+1 and QP_precode1−1) before and after the predictive quantization parameter QPd.

In this way, the code quantity control unit 4 calculates high-precision generated code quantities through encoding similar to main encoding using the predictive quantization parameter QPd with which the possibility that a low-precision generated code quantity is the most approximate to the target code quantity is extremely high and the quantization parameters QP before and after the predictive quantization parameter QPd, on the basis of the prediction of low-precision generated code quantities based on the result of the first pre-encoding unit 1. Accordingly, the code quantity control unit 4 can calculate, almost precisely, high-precision generated code quantities in a case where the predictive quantization parameter QPd and the quantization parameters QP before and after the predictive quantization parameter QPd are used. Furthermore, the present invention focuses on that the fluctuation ratio of high-precision generated code quantities caused by change in quantization parameter QP is substantially constant in a narrow range. The code quantity control unit 4 calculates high-precision generated code quantities obtained when quantization parameters QP approximate to the predictive quantization parameter QPd are used on the basis of the fluctuation ratio of high-precision generated code quantities in the predictive quantization parameter QPd and the quantization parameters QP before and after the predictive quantization parameter QPd. Accordingly, the code quantity control unit 4 can calculate high-precision generated code quantities almost precisely for the quantization parameters QP approximate to the predictive quantization parameter QPd.

Additionally, the present invention is not limited to the above-described embodiment, and various improvements and changes are acceptable without deviating from the intention of the invention.

For example, the above-described image encoding device and image encoding method can also be carried out as a computer program loaded in the device or a recording medium carrying the program, and as a computer program for executing the method or a recording medium carrying the program.

Additionally, the above-described series of encoding processes can be executed by hardware and can be executed by software. In a case where the encoding processes are realized by software, the image encoding device 100 is virtually formed in a CPU or a RAM. Then, an encoding program stored in a ROM is expanded in a RAM, whereby the encoding processes are executed.

[1-4. Process Procedure]

Hereinafter, an encoding process procedure RT1 performed by the image encoding device 100 according to an embodiment of the present invention will be described in detail with reference to the flowchart illustrated in FIG. 3. Part or whole of this process procedure also corresponds to the image encoding method according to an embodiment.

First, the activity calculating unit 16 calculates activities in units of MBs, and sorts the MBs into activity groups in accordance with resulting values (step S1).

Subsequently, the intra-screen prediction mode determining unit 11 determines an intra-screen prediction mode on the basis of the input image 91 (step S2). This intra-screen prediction mode is also used in second pre-encoding performed by the second pre-encoding unit 2 and main encoding performed by the main encoding unit 3.

Then, the intra-screen prediction processing unit 12 calculates difference image data between a predictive image and the input image. Here, the input image 91 is used as a predictive image in order to reduce the process. Then, the DCT unit 13 performs integer precision DCT and transmits DCT coefficients to the quantizing unit 14 (step S3).

The quantizing unit 14 quantizes DCT coefficient values using a plurality of selected quantization parameters QP1 of arbitrary intervals as average quantization parameters (BaseQP) of a picture. The entropy code length calculating unit 15 performs variable-length encoding on quantization coefficients and calculates a code length, thereby obtaining generated code quantities for the respective selected quantization parameters QP1 (step S4). At this time, values are given in view of an activity as quantization parameters QP of an MB as described above, and then encoding is performed. That is, as described above, quantization parameters QP of an MB are obtained by adding an offset depending on an activity group to an average quantization parameter (BaseQP) of the picture.

Additionally, in a case of responding to an adaptive quantization matrix Q Matrix switching process, the above-described process is performed for each quantization matrix Q Matrix. That is, pre-encoding is performed using selected quantization parameters QP1 having discrete values for each quantization matrix Q Matrix, whereby a generated code quantity of one picture is obtained. At this time, the selected quantization parameters QP1 are selected so as to cover an allowable range of quantization parameters QP for each quantization matrix Q Matrix.

Then, the code quantity control unit 4 performs a process of correcting generated code quantities calculated by the first pre-encoding unit 1 to calculate low-precision generated code quantities. The code quantity control unit 4 corrects an error caused by simplifying pre-encoding and also calculates low-precision generated code quantities corresponding to the quantization parameters QP other than the selected quantization parameters QP1 by an interpolation process (step S5).

The code quantity control unit 4 executes the process f step S5 on the respective quantization matrixes Q Matrix and calculates low-precision generated code quantities of the respective quantization matrixes Q Matrix (step S6). In the foregoing process, the low-precision generated code quantities corresponding to all necessary quantization parameters QP can be obtained. Among the quantization parameters QP that can generate the low-precision generated code quantity that is the most approximate to the target code quantity, the quantization matrix Q Matrix with the smallest slope is selected as a predictive quantization matrix Q MatrixD. Furthermore, the code quantity control unit 4 selects, as the predictive quantization parameter QPd, the quantization parameter QP that can generate the low-precision generated code quantity that is the most approximate to the target code quantity corresponding to the predictive quantization matrix Q MatrixD (step S7). Also, by selecting a quantization matrix Q Matrix in the above-described manner, the range of available quantization parameters QP is limited, so that the range of selected quantization parameters QP1 for calculating low-precision generated code quantities by the first pre-encoding unit 1 can be reduced. Accordingly, the predictive quantization matrix Q MatrixD and the predictive quantization parameter QPd determined by the first pre-encoding unit 1 are obtained.

Subsequently, a generated code quantity obtaining process is performed by the second pre-encoding unit 2 (steps S8 to S10). The purpose of this second pre-encoding unit 2 is performing pre-encoding again to increase the precision of the estimated basic quantization parameter $QP_{MB}$ considering that the predictive quantization parameter QPd estimated by the first pre-encoding unit 1 has an error.

That is, pre-encoding is performed again using quantization parameters QP approximate to the predictive quantization parameter QPd that is roughly estimated on the basis of the result of the first pre-encoding unit 1 to obtain high-precision generated code quantities, whereby the quantization parameter QP that is the most approximate to the target code quantity is obtained again. For entropy code length calculation, the same method as that for main encoding (CABAC or CAVLC) is used.

Specifically, an intra-screen prediction process by the intra-screen prediction processing unit 21 is performed using the intra-screen prediction mode determined from the result of the first pre-encoding unit 1, and DCT by the DCT unit 22 is performed (step S8). The second pre-encoding unit 2 shares, as a local decode image (predictive image) used for intra-screen prediction, a local decode image that is quantized with the predictive quantization parameter QPd (QP_pre-code1) estimated on the basis of the result of the first pre-encoding unit 1.

In quantization, the predictive quantization parameter QPd (QP_precode1) determined on the basis of the result of the first pre-encoding unit 1, the quantization matrix Q Matrix, and an activity group are used. The predictive quantization parameter QPd (QP_precode1) is set in the quantizing unit 23-1, the quantization parameter QP (QP_precode1−1) smaller than the predictive quantization parameter QPd by "1" is set in the quantizing unit 23-2, and the quantization parameter (QP_precode1+1) larger than the predictive quantization parameter QPd by "1" is set in the quantizing unit 23-3.

Furthermore, values are given to the quantization parameters (QP) of an MB considering an activity, and encoding is performed. In the above-described second pre-encoding, a high-precision generated code quantity of one picture can be obtained (step S9).

Subsequently, the code quantity control unit 4 determines the basic quantization parameter $QP_{MB}$ on the basis of the high-precision generated code quantities obtained on the basis of the second pre-encoding unit 2 (step S10).

Subsequently, the main encoding unit 3 performs main encoding (step S11). In the main encoding, encoding is performed using the basic quantization parameter $QP_{MB}$ of the picture determined on the basis of the result of the second pre-encoding unit 2, the predictive quantization matrix Q MatrixD determined on the basis of the result of the first pre-encoding unit 1, and the activity group. In this way, a series of processes related to encoding end.

Hereinafter, the Q Matrix determination process procedure RT2 executed in step S7 of the encoding process procedure RT1 performed by the image encoding device 100 will be further described with reference to the flowchart illustrated in FIG. 4.

Upon start of this process, the code quantity control unit 4 first initializes Id to Id=0 (step S21), and then compares the quantization parameter (QP) corresponding to the low-precision generated code quantity that is the most approximate to the target code quantity with the maximum quantization parameter QP (QMatrixTheshold [Id]) that is possible in the quantization matrix Q-Matrix, from the quantization matrix Q-Matrix having Id of a small value (step S22). Then, if the quantization parameter (QP) corresponding to the low-precision generated code quantity that is the most approximate to the target code quantity in the Id-th quantization matrix Q-Matrix is smaller than QMatrixTheshold[Id], the code quantity control unit 4 determines the current quantization matrix Q-Matrix to be the predictive quantization matrix Q MatrixD. Furthermore, after determining the quantization parameter (QP) corresponding to the low-precision generated code quantity that is the most approximate to the target code quantity in the predictive quantization matrix Q MatrixD to be the predictive quantization parameter QPd (step S23), the code quantity control unit 4 ends the Q Matrix determination process procedure RT2.

On the other hand, in step S22, if the quantization parameter (QP) corresponding to the low-precision generated code quantity that is the most approximate to the target code quantity in the Id-th quantization matrix Q-Matrix is equal to or larger than QMatrixTheshold[Id], the code quantity control unit 4 increments Id (step S24). The code quantity control unit 4 determines whether Id=a value smaller than the total number of quantization matrixes Q-Matrix by "1" (NumOfQMatrixId-1) (step S25). Then, if Id=NumOfQMatrixId-1 is not satisfied, the process returns to step S22, where the next quantization matrix Q-Matrix is checked. On the other hand, if Id=NumOfQMatrixld-1 is satisfied, the quantization matrix Q-Matrix having the steepest slope (the quantization matrix Q-Matrix whose ID is NumOfMatrixld) is selected (step S23), and the Q Matrix determination process procedure RT2 ends.

In this Q Matrix determination process procedure RT2 illustrated in FIG. 4, the code quantity control unit 4 sets a possible maximum quantization parameter QP for each quantization matrix Q-Matrix, and determines whether the low-precision generated code quantity corresponding to the quantization parameter QP in which the low-precision generated code quantity is estimated to be the most approximate to the target code quantity actually has a value approximate to the target code quantity in order from a quantization matrix Q-Matrix having a gentle slope. Then, if the low-precision generated code quantity has an approximate value, the corresponding quantization matrix Q-Matrix is determined to be the predictive quantization matrix Q MatrixD to be used in main encoding.

As described above, according to an embodiment of the present invention, pre-encoding is performed twice in units of pictures. Also, the image encoding device 100 employs a partially-parallel configuration based on partial sharing of the circuit in order to overcome a problem in that a processing quantity increases, resulting in an increase in circuit scale of encoding, for the purpose of increasing efficiency. Accordingly, the configuration of pre-encoders is simplified, and an error due to the simplification is corrected using statistical data.

Therefore, the image encoding device 100 can adjust a main encoding generated code quantity that is generated in main encoding to a target code quantity given to one picture without executing intra-screen feedback control. Accordingly, the image encoding device 100 can eliminate problems in feedback control, such as a negative effect of an inappropriate initial value of a feedback parameter and an inappropriate distribution of a target code quantity. As a result, the image encoding device 100 can match the main encoding generated code quantity to the target code quantity, and determine a code quantity distribution in view of a visual characteristic, that is, appropriate quantization parameters.

Figure 7:
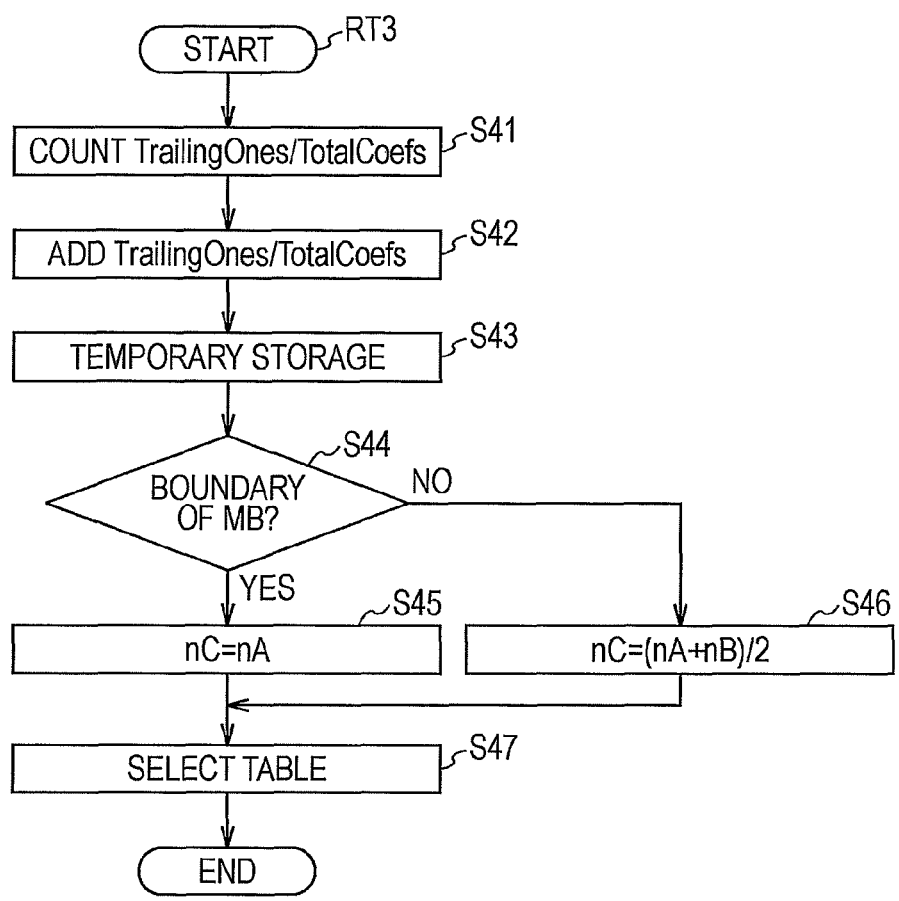
FIG. 7 is a flowchart illustrating a VLC table selection process procedure.

Next, a description will be given with reference to the flowchart illustrated in FIG. 7 about a VLC table selection process procedure RT1 executed by the CAVLC shared calculating unit 150 in accordance with an encoding program.

The CAVLC calculating unit 15 starts the VLC table selection process procedure RT1 when being supplied with DCT coefficients from the quantizing unit 14, and moves to step S41. The CAVLC calculating unit 15 counts, with the CAVLC calculating units 15-1 to 15-$n$, TrailingOnes and TotalCoefs, and then moves to the next step S42.

In step S2, the CAVLC calculating unit 15 adds the TrailingOnes and TotalCoefs to calculate the numbers of nonzero coefficients, and then moves to the next step S43.

In step S3, the CAVLC calculating unit 15 temporarily stores the numbers nA and nB of nonzero coefficients as a reference target, and then moves to the next step S44.

In step S44, the CAVLC calculating unit 15 determines whether a 4×4 block as a process target is on an upper boundary of an MB. Here, if a negative result is obtained, this indicates that nB as a reference target is held in the nB holding memory 204. At this time, the CAVLC calculating unit 15 moves to the next step S46. In step S46, the CAVLC calculating unit 15 uses an average value of nA and nB as the table selection index nC, and then moves to the next step S47.

On the other hand, if a positive result is obtained in step S44, the CAVLC calculating unit 15 moves to step S45 and uses nA as the table selection index nC, and then moves to the next step S47.

In step S47, the CAVLC calculating unit 15 selects a VLC table on the basis of the table selection index nC, and moves to an end step to end the process.

[1-5. Operation and Effect]

In the above-described configuration, the image encoding device 100 is supplied with the input image 91 that is line-scanned in units of MBs as scan blocks, each constituted by a plurality of 4×4 blocks, while being scanned in units of 4×4 blocks as encoding blocks, each constituted by a plurality of pixels. The image encoding device 100 selects a VLC (variable length) table corresponding to a table selection index nC, which is an average value of the numbers nB and nA of nonzero coefficients as encoding values on which variable-length encoding is to be performed in upper-adjoining and left-adjoining 4×4 blocks of a 4×4 block as an encoding target in quantization coefficients as encoding target data based on the input image 91. At this time, in a case where the 4×4 block as an encoding target is at the upper end of an MB, the image encoding device 100 equates the number nB of nonzero coefficients of the upper-adjoining 4×4 block with the number nA of nonzero coefficients of the left-adjoining 4×4 block. The image encoding device 100 performs variable-length encoding on the number of nonzero coefficients of the 4×4 block as an encoding target in quantization coefficients using a selected VLC table.

Accordingly, in the image encoding device 100, a memory for one line for referring to the number nB of upper-adjoining nonzero coefficients at the upper end of an MB can be omitted, so that the circuit configuration can be simplified.

The image encoding device 100 encodes the input image 91 by quantizing it using quantization steps based on at least quantization factors (quantization parameters QP or quantization matrixes, or both of them), thereby generating quantization coefficients as encoding target data.

The image encoding device 100 determines a basic quantization parameter $QP_{MB}$ with which a main encoding generated code quantity obtained by performing main encoding on the input image 91 is predicted to be the most approximate to the target code quantity, on the basis of low-precision generated code quantities obtained through variable-length encoding performed on quantization coefficients. The image encoding device 100 performs main encoding on the input image 91 on the basis of the determined basic quantization parameter $QP_{MB}$.

Accordingly, the image encoding device 100 can determine the basic quantization parameter $QP_{MB}$ on the basis of low-precision generated code quantities calculated with a simple configuration.

The image encoding device 100 performs a DCT process, which is orthogonal transformation, on the input image 91 in units of 4×4 blocks and then quantizes the input image 91 using quantization steps based on quantization parameters QP to encode it, thereby generating quantization coefficients. The image encoding device 100 determines a predictive quantization parameter QPd serving as a predictive quantization factor approximate to the basic quantization parameter $QP_{MB}$. The image encoding device 100 encodes the input image 91 on the basis of the selected predictive quantization parameter QPd and quantization parameters QP approximate to the predictive quantization parameter QPd and calculates a high-precision generated code quantity of the input image 91. The image encoding device 100 determines the basic quantization parameter $QP_{MB}$ on the basis of the calculated high-precision generated code quantity of the input image 91.

Accordingly, the image encoding device 100 can determine the basic quantization parameter $QP_{MB}$ on the basis of the predictive quantization parameter QPd that is highly possible to be the basic quantization parameter $QP_{MB}$ and quantization parameters QP approximate to the predictive quantization parameter QPd. Therefore, the image encoding device 100 can enhance the precision of predicting the basic quantization parameter $QP_{MB}$.

<2. Second Embodiment>

[2-1. Configuration of Image Encoding Device]

Figure 8:
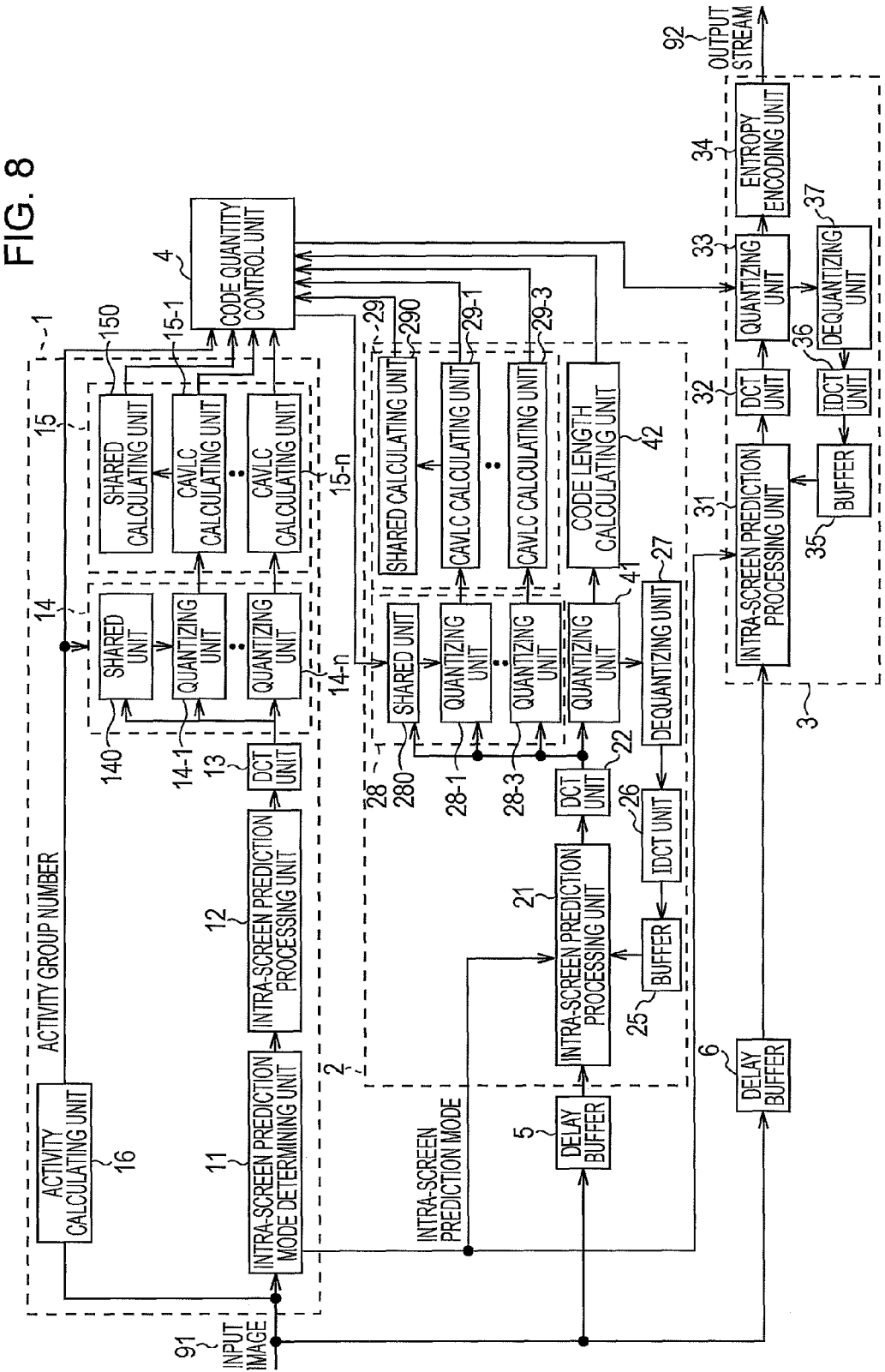
FIG. 8 is a configuration diagram of an image encoding device according to a second embodiment.
Figure 9:
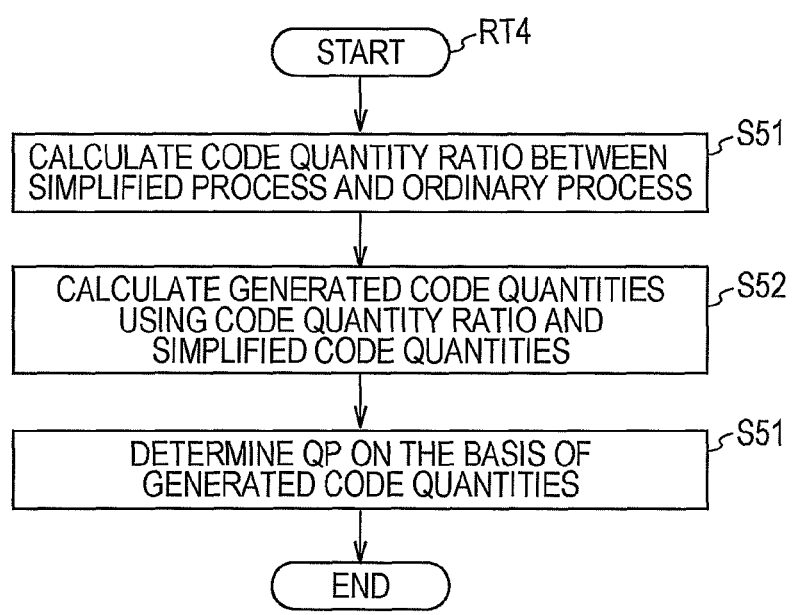
FIG. 9 is a flowchart explaining a basic quantization parameter determination process procedure.
Figure 10:
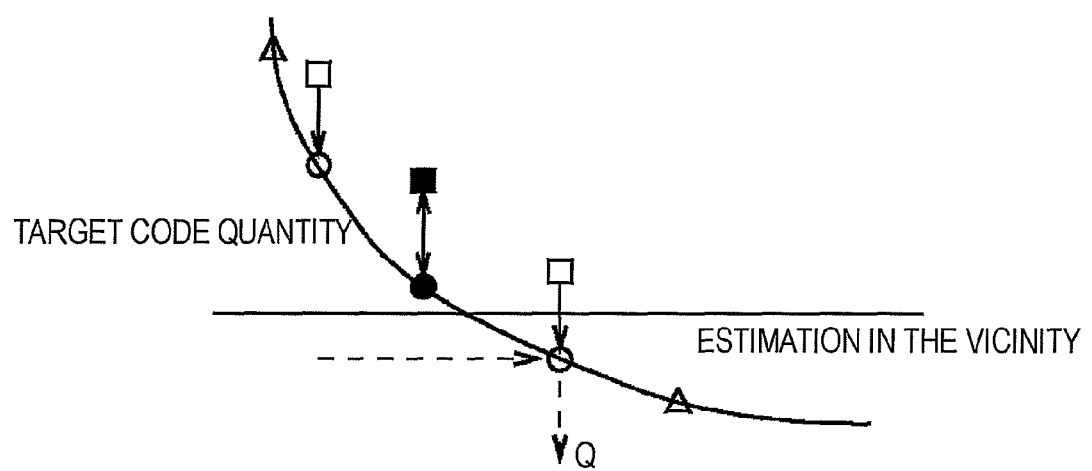
FIG. 10 is a conceptual view explaining an estimation process of a basic quantization parameter.
Figure 11:
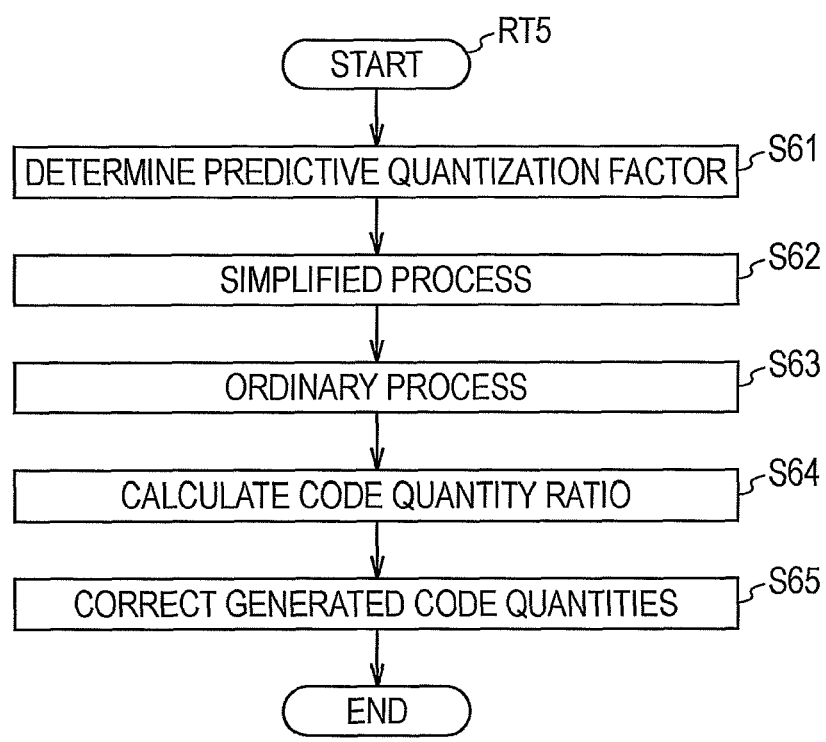
FIG. 11 is a flowchart explaining a high-precision generated code quantity calculation process procedure.

In the second embodiment illustrated in FIGS. 8 to 10, the parts corresponding to those in FIGS. 1 to 7 are denoted by the same reference numerals and the description about the same parts will be omitted. In the second embodiment, a difference from the first embodiment is the configuration of a simplified quantizing unit 28, a quantizing unit 41, a simplified code length calculating unit 29, and an entropy code length calculating unit 42 in the second pre-encoding unit 2.

An image encoding device 200 and an image encoding method according to this embodiment are characterized by the following.

That is, the image encoding device 200 performs a simplified process of code quantity control using an image compression method represented by MPEG4 AVC (Advanced Video Coding: advanced moving image compression coding standard) or the like, whereby hardware is reduced. The image encoding device 200 is a system capable of selecting both entropy encoding methods: context-adaptive binary arithmetic coding (CABAC) and context-adaptive variable length coding (CAVLC). When the image encoding device 200 performs quantization in parallel using different quantization values to calculate a code length in order to predict a generated code quantity, the image encoding device 200 uses a single encoding method for the parallel portion to reduce the circuit scale. That is, in the image encoding device 200, the simplified quantizing unit 28 in the second pre-encoding unit 2 is constituted by a shared unit 280 and quantizing units 28-1 to 28-3, as in the quantizing unit 14 in the first pre-encoding unit 1. Also, in the image encoding device 200, the simplified code length calculating unit 29 for calculating a simplified generated code quantity by CAVLC is constituted as a shared calculating unit 290 and CAVLC calculating units 29-1 to 29-3, as in the CAVLC calculating unit 15 in the first pre-encoding unit 1. The CAVLC calculating unit 29-1 calculates a generated code quantity based on a predictive quantization parameter QPd. The CAVLC calculating units 29-2 and 29-3 calculate generated code quantities based on quantization parameters QP before and after the predictive quantization parameter QPd.

Furthermore, in the image encoding device 200, there is provided only one stage of entropy code length calculating unit 42 for calculating a generated code quantity using CAVLC or CABAC, and switching between CAVLC and CABAC is performed in accordance with the method of main encoding, whereby a high-precision generated code quantity based on the predictive quantization parameter QPd is calculated. Also, in a case where CAVLC is used for main encoding, the image encoding device 200 predicts high-precision generated code quantities based on quantization parameters QP other than the predictive quantization parameter QPd on the basis of a difference between the generated code quantity that is calculated by the CAVLC calculating unit 29-1 and that is based on the predictive quantization parameter QPd and the high-precision generated code quantity that is calculated by the entropy code length calculating unit 42 and that is based on the predictive quantization parameter QPd. On the other hand, in a case where CABAC is used for main encoding, the image encoding device 200 calculates a difference (ratio) in generated code quantity between CABAC and CAVLC, thereby predicting a high-precision generated code quantity of CABAC on the basis of a high-precision generated code quantity of CAVLC. Accordingly, the image encoding device 200 does not require a circuit for CABAC in a parallel portion for calculating high-precision generated code quantities based on quantization parameters QP before and after the predictive quantization parameter QPd, whereby the circuit scale is reduced.

FIG. 8 illustrates and describes the configuration of the image encoding device 200 according to an embodiment of the present invention.

The second pre-encoding unit 2 is a module for performing second pre-encoding and includes the intra-screen prediction processing unit 21, the DCT unit 22, the quantizing unit 41, the entropy code length calculating unit 42, the buffer 25, the IDCT (inverse DCT) unit 26, the dequantizing unit 27, the simplified quantizing unit 28, and the simplified code length calculating unit 29.

The code quantity control unit 4 is a module for performing code quantity control.

[2-2. Calculation of High-precision Generated Code Quantity Using Simplified CAVLC]

As described above, the simplified quantizing unit 28 separately outputs, as multiplication coefficients, a scaling factor MF and a reciprocal of a quantization matrix Q Matrix (1/Q Matrix). The simplified quantizing unit 28 causes a slight error compared to the conventional quantizing unit 300 due to rounding that occurs when a reciprocal of the quantization matrix Q Matrix is output. Also, the simplified code length calculating unit 29 causes a slight error resulting from equating the number nB of upper-adjoining nonzero coefficients with the number nA of left-adjoining nonzero coefficients in a 4×4 block at the upper end of an MB. Therefore, the image encoding device 200 corrects generated code quantities calculated by the simplified code length calculating unit 29 for quantization parameters QP approximate to the predictive quantization parameter QPd on which the same encoding as main encoding is executed, thereby calculating high-precision generated code quantities.

In a case of using CAVLC for main encoding, the image encoding device 200 calculates high-precision generated code quantities approximate to the predictive quantization parameter QPd on the basis of the ratio between the high-precision generated code quantity that is calculated by the entropy code length calculating unit 42 and that is based on the predictive quantization parameter QPd and the generated code quantity obtained through simplified encoding that is calculated by the CAVLC calculating unit 29-1 and that is based on the predictive quantization parameter QPd.

Assume that the ratio between the high-precision generated code quantity Generated_bits (QP_precode1) of an ordinary process (process performed by the entropy code length calculating unit 42) with the predictive quantization parameter QPd (QP_precode1) and the generated code quantity Reduce_Generated_bits (QP_precode1) of a simplified process (process performed by the CAVLC calculating unit 29-1) is a code quantity ratio R_reduction, which is expressed by the following equation.

$$R\_reduction = Geberated\_bits(QP\_precode1)/Reduce\_Generated\_bits(QP\_precode1)$$

The code quantity control unit 4 calculates high-precision generated code quantities based on quantization parameters QP before and after the predictive quantization parameter QPd using the code quantity ratio R_reduction and generated code quantities obtained through a simplified process. Here, generated code quantities obtained using the code quantity ratio R_reduction and a simplified process of the quantization parameter (QPprecode1−1) smaller than the predictive quantization parameter QPd by "1" and the quantization parameter (QP_precode1+1) larger than the predictive quantization parameter QPd by "1" are defined as a simplified generated code quantity Reduce_Generated_bits (QP_precode1−1) and a simplified generated code quantity Reduce_Generated_bits (QP_precode1+1), respectively. Focusing on the point in that the ratios between the code quantity in an ordinary process and the code quantity in a simplified process are substantially equal in a case where quantization parameters QP are approximate to each other, the code quantity control unit 4 predicts high-precision generated code quantities based on the quantization parameter (QP_precode1−1) smaller than the predictive quantization parameter QPd by "1" and the quantization parameter (QP_precode1+1) larger than the predictive quantization parameter QPd by "1" using the code quantity ratio R_reduction based on the predictive quantization parameter QPd.

Specifically, assuming that a high-precision generated code quantity of an ordinary process is Generated_bits, the code quantity control unit 4 calculates the high-precision generated code quantity Generated_bits (QP_precode1−1) for the quantization parameter (QP_precode1−1) smaller than the predictive quantization parameter QPd by "1" in accordance with the following equation.

$$Generated\_bits(QP\_precode1-1) = R\_reduction \times Reduce\_Generated\_bits(QP\_precode1-1)$$

The code quantity control unit 4 calculates the high-precision generated code quantity Generated_bits (QP_precode1+1) for the quantization parameter (QP_precode1+1) larger than the predictive quantization parameter QPd by "1" in accordance with the following equation.

$$Generated\_bits(QP\_precode1+1) = R\_reduction \times Reduce\_Generated\_bits(QP\_precode1+1)$$

That is, the code quantity control unit 4 multiplies the generated code quantities obtained through a simplified process (the process performed by the CAVLC calculating units 29-2 and 29-3) by the code quantity ratio R_reduction, thereby calculating high-precision generated code quantities for quantization parameters QPd before and after the predictive quantization parameter QPd.

Furthermore, as described above in the first embodiment, the code quantity control unit 4 calculates high-precision generated code quantities for other quantization parameters QP on the basis of the fluctuation ratio DiffRatio of the predictive quantization parameter QPd (QP_precode1) and the quantization parameters QP (QPprecode1−1 and +1) before and after the predictive quantization parameter QPd.

In this way, the image encoding device 200 calculates generated code quantities using simplified CAVLC (simplified process) on the basis of the predictive quantization parameter QPd and quantization parameters QP approximate thereto. The image encoding device 200 calculates a high-precision generated code quantity based on the predictive quantization parameter QPd using the same encoding as the main encoding (ordinary process).

Then, the image encoding device 200 calculates a code quantity ratio R_reduction between the simplified process and the ordinary process, and multiplies the code quantity ratio R_reduction by the generated code quantities obtained through a simplified process based on quantization parameters QP approximate to the predictive quantization parameter QPd. Accordingly, the image encoding device 200 can correct an error caused by the simplified process and calculate high-precision generated code quantities for quantization parameters QP approximate to the predictive quantization parameter QPd at high precision.

[2-3. Calculation of High-precision Generated Code Quantity Using CABAC]

As described above, a process of CABAC is complicated and causes the circuit scale to be large. Then, in the image encoding device 200, since the same encoding as the main encoding (i.e., CABAC) is executed for the predictive quantization parameter QPd, the generated code quantity obtained through CAVLC calculated by the simplified code length calculating unit 29 is corrected for the quantization parameters QP approximate to the predictive quantization parameter QPd, whereby a high-precision generated code quantity in a case of using CABAC is calculated.

In a case of using CABAC for main encoding, the second pre-encoding unit 2 calculates only a high-precision generated code quantity based on the predictive quantization parameter QPd by actually encoding it. In this case, the code quantity control unit 4 defines the ratio between the high-precision generated code quantity Generated_bits (QP_precode1) at the predictive quantization parameter QPd (QP_precode1) and the generated code quantity Reduce_Generated_bits (QP_precode1) of a simplified process (a process performed by the CAVLC calculating unit 29-1) as a code quantity ratio R_reduction.

Then, as in the case of CAVLC, the code quantity control unit 4 multiplies the generated code quantity obtained through a simplified process (a process performed by the CAVLC calculating units 29-2 and 29-3) by the code quantity ratio R_reduction, thereby calculating high-precision generated code quantities in CABAC for the quantization parameters QPd before and after the predictive quantization parameter QPd.

Furthermore, as described above in the first embodiment, the code quantity control unit 4 calculates high-precision generated code quantities for other quantization parameters QP on the basis of the fluctuation ratio DiffRatio of the predictive quantization parameter QPd (QP_precode1) and the quantization parameters QP (QPprecode1−1 and +1) before and after the predictive quantization parameter QPd.

In this way, the image encoding device 200 calculates generated code quantities using simplified CAVLC (simplified process) on the basis of the predictive quantization parameter QPd and the quantization parameters QP approximate thereto. The image encoding device 200 calculates a high-precision generated code quantity based on the predictive quantization parameter QPd using CABAC (ordinary process) that is the same as the main encoding.

Then, the image encoding device 200 calculates a code quantity ratio R_reduction between a simplified process and an ordinary process, and multiplies the code quantity ratio R_reduction by the generated code quantities obtained through a simplified process based on the quantization parameters QP approximate to the predictive quantization parameter QPd. Accordingly, the image encoding device 200 can predict a high-precision generated code quantity obtained through CABAC at high precision on the basis of a generated code quantity obtained through simplified CAVLC (simplified process). That is, the image encoding device 200 can predict high-precision generated code quantities by CABAC at high precision by being provided with only one CABAC circuit having a complicated circuit configuration, so that the circuit configuration can be significantly simplified compared to the first embodiment in which three CABAC circuits corresponding to the quantization parameters QP before and after the predictive quantization parameter QPd are provided in parallel.

[2-4. Process Procedure]

Next, a basic quantization parameter determination process procedure RT4 will be described with reference to the flowchart in FIG. 9 and FIG. 10.

After starting the basic quantization parameter determination process procedure RT4, the code quantity control unit 4 of the image encoding device 200 moves to step S51. In step S51, the code quantity control unit 4 calculates a code quantity ratio R_reduction between a simplified process performed by the CAVLC calculating unit 29-1 (indicated with a black square in FIG. 10) and an ordinary process performed by the entropy code length calculating unit 42 (indicated with a black circle in FIG. 10), and then moves to the next step S52.

In step S52, the code quantity control unit 4 multiplies the code quantity ratio R_reduction by the generated code quantities (indicated with white squares in FIG. 10) of the quantization parameters QP (QPprecode1−1 and +1) before and after the predictive quantization parameters QPd obtained through a simplified process, thereby calculating high-precision generated code quantities (indicated with white circles in FIG. 10) of the quantization parameters QP (QP_precode1−1 and +1) before and after the predictive quantization parameter QPd. Furthermore, the code quantity control unit 4 calculates high-precision generated code quantities (indicated with triangles in FIG. 10) for quantization parameters QP approximate to the predictive quantization parameter QPd on the basis of a fluctuation ratio DiffRatio of the generated code quantities in the predictive quantization parameter QPd and the quantization parameters QP before and after the predictive quantization parameter QPd, and moves to the next step S53.

In step S53, the code quantity control unit 4 determines the quantization parameter QP corresponding to the high-precision generated code quantity that is the most approximate to the target code quantity to be the basic quantization parameter $QP_{MB}$, and then moves to an end step to end the process.

Additionally, the present invention is not limited to the above-described embodiment, and various improvements and changes are acceptable without deviating from the intention of the invention.

For example, the above-described image encoding device and image encoding method can also be carried out as a computer program loaded to the device or a recording medium carrying the program, and as a computer program for executing the method or a recording medium carrying the program.

[2-5. Operation and Effect]

In the above-described configuration, the image encoding device 200 determines a predictive quantization parameter QPd serving as a predictive quantization factor that is predicted to be approximate to a basic quantization parameter $QP_{MB}$ serving as a basic quantization factor with which a main encoding generated code quantity obtained by encoding the input image 91 by the main encoding unit 3 is predicted to be the most approximate to the target code quantity (step S61 in FIG. 1).

On the basis of the predictive quantization parameter QPd and the quantization parameters QP approximate to the predictive quantization parameter QPd, the image encoding device 200 encodes the input image 91 in a simpler manner than the encoding performed by the quantizing unit 41 and the entropy code length calculating unit 42 (performs a simplified process), thereby calculating generated code quantities obtained through simplified encoding (step S62). The image encoding device 200 encodes the input image 91 on the basis of the predictive quantization parameter QPd (performs an ordinary process), thereby calculating a generated code quantity obtained through an ordinary process (step S63).

The image encoding device 200 calculates a code quantity ratio R_reduction of a generated code quantity Reduce_Generated_bits (QP_precode1) based on the predictive quantization parameter QPd obtained through a simplified process to a generated code quantity Generated_bits (QP_precode1) based on the predictive quantization parameter QPd obtained through an ordinary process (step S64).

The image encoding device 200 multiplies the code quantity ratio R_reduction by the generated code quantities Reduce_Generated_bits (QP_precode1+1, −1) based on the quantization parameters QP approximate to the predictive quantization parameter QPd, thereby correcting the generated code quantities Reduce_Generated_bits (QP_precode1+1, −1) based on the quantization parameters QP approximate to the predictive quantization parameter QPd (step S65).

Accordingly, the image encoding device 200 may execute the same encoding as main encoding on only the predictive quantization parameter QPd, so that the circuit configuration of the second pre-encoding unit 2 can be simplified while maintaining the precision of high-precision generated code quantities.

The image encoding device 200 encodes the input image 91 in a simple manner using variable-length encoding (CAVLC) (simplified process), and encodes the input image 91 using arithmetic encoding (CABAC) (ordinary process).

Accordingly, in the image encoding device 200, CAVLC can be used as a substitute for CABAC, in which the circuit configuration is complicated, for quantization parameters QP approximate to the predictive quantization parameter QPd, so that the circuit configuration can be simplified.

The image encoding device 200 encodes the input image 91 in a simpler manner than encoding (ordinary process) using simplified CAVLC (simplified process).

Accordingly, in the image encoding device 200, the configuration of the simplified code length calculating unit 29 can be simplified.

The image encoding device 200 encodes, in a simpler manner than main encoding, encoding target data (quantization coefficients) based on the input image 91 that is line-scanned in units of MBs, each serving as a scan block constituted by a plurality of 4×4 blocks, while being scanned in units of 4×4 blocks, each serving as an encoding block constituted by a plurality of pixels. The image encoding device 200 selects a variable-length (VLC) table corresponding to an average value of encoding values (the numbers nA and nB of nonzero coefficients) on which variable-length encoding is performed in upper-adjoining and left-adjoining 4×4 blocks of a 4×4 block as an encoding target. In a case where the 4×4 block as an encoding target is at the upper end of an MB, the image encoding device 200 equates the number nA of nonzero coefficients of the upper-adjoining 4×4 block with the number nB of nonzero coefficients of the left-adjoining 4×4 block, thereby encoding the input image 91 in a simple manner (simplified process).

When encoding the input image 91 (ordinary process), the image encoding device 200 selects a VLC table corresponding to an average value of the numbers nA and nB of nonzero coefficients on which variable-length encoding is performed in the upper-adjoining and left-adjoining 4×4 blocks of the 4×4 block as an encoding target, regardless of the position of the 4×4 block in an MB.

Accordingly, in the image encoding device 200, a line memory for storing one line of the number nB of nonzero coefficients of a 4×4 block at the lower end of an MB can be omitted in the simplified code length calculating unit 29, so that the configuration of the simplified code length calculating unit 29 can be simplified.

The image encoding device 200 encodes, in a simpler manner than main encoding, the input image 91 through simplified quantization performed by the simplified quantizing unit 28. That is, the image encoding device 200 stores first multiplication coefficients (scaling factors MF) according to combinations of positions (DCT addresses) in a 4×4 block and quantization parameters QP, specifies scaling factors MF available in accordance with all the quantization parameters QP on the basis of the positions in the 4×4 block, and outputs the specified scaling factors MF. The image encoding device 200 selects scaling factors MF corresponding to quantization parameters QP to be used from among the output scaling factors MF provided in parallel, the number of which is the same as the number of a plurality of encoding target data items (DCT coefficients). The image encoding device 200 multiplies a value of the 4×4 block by the selected scaling factors MF provided in parallel, the number of which is the same as the number of a plurality of encoding target data items (DCT coefficients). The image encoding device 200 shifts, to the right by the number of digits according to the quantization parameters QP, the multiplied value of the 4×4 block provided in parallel, the number of which is the same as the number of a plurality of encoding target data items (DCT coefficients).

Accordingly, in the image encoding device 200, part of the simplified quantizing unit 28 (shared unit 28) can be shared, so that the configuration of the simplified quantizing unit 28 can be simplified.

The image encoding device 200 stores reciprocal values of quantization matrixes Q Matrix serving as second multiplication coefficients according to combinations of quantization matrixes Q Matrix and positions in a 4×4 block, specifies reciprocal values of quantization matrixes Q Matrix available in accordance with all the quantization matrixes Q Matrix on the basis of the positions (DCT addresses) in the 4×4 block, and outputs the specified reciprocal values of quantization matrixes Q Matrix. Among the output reciprocal values of quantization matrixes Q Matrix, the image encoding device 200 selects reciprocal values of quantization matrixes Q Matrix according to the quantization matrixes Q Matrix to be used.

Accordingly, the image encoding device 200 can reduce the number of combinations compared to a case of storing multiplication coefficients (MF*16/QMatrix), and can reduce the storage capacity necessary for the scale factor RAM 102 and the 1/matrix RAM 103.

The image encoding device 200 calculates high-precision generated code quantities Generated_bits (QP) based on quantization parameters QP other than the predictive quantization parameter QPd and quantization parameters QP approximate to the predictive quantization parameter QPd on the basis of the fluctuation ratio DiffrRatio between the corrected high-precision generated code quantities Generated_bits (QP_precode1+1, −1) based on quantization parameters QP approximate to the predictive quantization parameter QPd and the high-precision generated code quantity Generated_bits (QP_precode1) based on the predictive quantization parameter QPd calculated by the entropy code length calculating unit 42.

Accordingly, the image encoding device 200 can calculate high-precision generated code quantities Generated_bits (QP) at high precision also for quantization parameters QP on which actual encoding is not performed by the second pre-encoding unit 2.

The image encoding device 200 determines, as the basic quantization parameter $QP_{MB}$, the quantization parameter QP corresponding to the generated code quantity that is the most approximate to the target code quantity among the high-precision generated code quantity Generated_bits (QP_precode1) based on the predictive quantization parameter QPd, the corrected generated code quantities Generated_bits (QP_precode1+1, −1) based on the quantization parameters QP approximate to the predictive quantization parameter QPd, and the generated code quantities Generated_bits (QP) based on the quantization parameters QP other than the predictive quantization parameter QPd and the quantization parameters QP approximate to the predictive quantization parameter QPd.

Accordingly, the image encoding device 200 can determine a basic quantization parameter $QP_{MB}$ on the basis of high-precision generated code quantities calculated at high precision, and thus can select an appropriate basic quantization parameter $QP_{MB}$.

The image encoding device 200 performs main encoding on the input image 91 on the basis of the determined basic quantization parameter $QP_{MB}$.

Accordingly, the image encoding device 200 can execute main encoding on the basis of the basic quantization parameter $QP_{MB}$, so that the generated code quantity of main encoding can be controlled to be approximate to the target code quantity.

According to the above-described configuration, the image encoding device 200 encodes the input image 91 on the basis of the predictive quantization parameter QPd using the same ordinary process as that of main encoding, while encoding the input image 91 in a simple manner (simplified process) on the basis of the predictive quantization parameter QPd and the quantization parameters QP approximate to the predictive quantization parameter QPd. The image encoding device 200 calculates a code quantity ratio R_reduction between the high-precision generated code quantity obtained through an ordinary process based on the predictive quantization parameter QPd and the generated code quantity obtained through a simplified process based on the predictive quantization parameter QPd. The image encoding device 200 utilizes a characteristic that the code quantity ratio between the generated code quantity in an ordinary process and the generated code quantity in a simplified process is substantially constant in the quantization parameters QP approximate to the predictive quantization parameter QPd. The image encoding device 200 calculates high-precision generated code quantities based on the quantization parameters QP approximate to the predictive quantization parameter QPd on the basis of the code quantity ratio R_reduction and the generated code quantities obtained through a simplified process based on the quantization parameters QP approximate to the predictive quantization parameter QPd.

Accordingly, the image encoding device 200 may execute the same encoding as main encoding on only the predictive quantization parameter QPd, and may execute simplified encoding on the quantization parameters QP approximate to the predictive quantization parameter QPd. Therefore, the present invention can realize an image processing device and an image processing method that enable a simplified circuit configuration.

<3. Other Embodiments>

Additionally, in the above-described first embodiment, a description has been given about a case of using, as encoding target data, quantization coefficients obtained by executing a DCT process as orthogonal transformation on difference image data based on intra prediction and further executing quantization. The present invention is not limited thereto. For example, the input image 91 may be used as encoding target data. As the input image 91, data on which any one or two of intra prediction, orthogonal transformation, and quantization has been performed may be used, and furthermore data on which another process has been performed may be used. Of course, wavelet transformation or the like can be used as orthogonal transformation.

Also, in the above-described first and second embodiments, a description has been given about a case where a 4×4 block is used as an encoding block serving as an encoding target. The present invention is not limited thereto. For example, another unit such as an 8×8 block or a 2×2 block may be used as an encoding block.

Furthermore, in the above-described first and second embodiments, a description has been given about a case where the number of nonzero coefficients is used as an encoding value. The present invention is not limited thereto. For example, various values according to an encoding method, such as the number of zero-runs, may be used as an encoding value.

Furthermore, in the above-described first and second embodiments, a description has been given about a case where nC=nA+nB is used as an average value of encoding values. The present invention is not limited thereto, and nC=nA+nB+1 may be used as an average value of encoding values for convenience of rounding in computation.

Furthermore, in the above-described first and second embodiments, a description has been given about a case where the present invention is applied to simplified encoding for calculating low-precision generated code quantities in the first pre-encoding unit 1. The present invention is not limited thereto. For example, the present invention may be applied to calculate high-precision generated code quantities in the second pre-encoding unit 2. Of course, use in the main encoding unit 3 is acceptable. Also, the present invention can be applied to image encoding devices having various configurations other than the image encoding device 100 including the first pre-coding unit 1, the second pre-coding unit 2, and the third pre-coding unit 3.

Furthermore, in the above-described first and second embodiments, a description has been given about a case where the quantizing unit 14 and the CAVLC calculating unit 15 having the configuration illustrated in FIG. 4 (having a shared unit) are provided. The present invention is not limited thereto, and a quantizing unit 14 and a CAVLC calculating unit 15 having other various configurations may be provided.

Furthermore, in the above-described first and second embodiments, a description has been given about a case where scaling factors MF and reciprocals of quantization matrixes Q Matrix are separately stored in the shared coefficient unit 150. The present invention is not limited thereto, and values calculated by multiplying scaling factors MF by reciprocals of quantization matrixes Q Matrix may be stored as multiplication coefficients. In this case, all multiplication coefficients available in accordance with DCT addresses are output, and a selecting unit selects a multiplication coefficient in accordance with a quantization parameter QP and a quantization matrix.

Furthermore, in the above-described first and second embodiments, a description has been given about a case where the subtractors 108 to 117 having a ten-stage configuration are provided instead of dividers. The present invention is not limited thereto. The number of subtractors is not particularly limited, and dividers may also be used.

Furthermore, in the above-described first and second embodiments, a description has been given about a case where only half of DCT coefficients on the low-frequency side are divided by rescaling factors RF. The present invention is not limited thereto. For example, one third or two thirds of DCT coefficients on the low-frequency side (first half scan portion) may be used as the first half portion.

Furthermore, in the above-described second embodiment, a description has been given about a case where a 4×4 block is used as the unit of quantization. The present invention is not limited thereto. For example, various block sizes such as 8×8 and 16×16 may be used as the unit of quantization.

Furthermore, in the above-described first and second embodiments, a description has been given about a case where the present invention is applied to AVC. The present invention is not limited thereto, and the present invention can be applied to various encoding methods for adaptively selecting VLC tables. For example, in a case where the present invention is applied to MPEG-2, a quantization scale is used as a quantization factor.

Furthermore, in the above-described first and second embodiments, a description has been given about a case where a generated code quantity of each picture is suppressed to within a target code quantity. The present invention is not limited thereto. For example, a generated code quantity of each slice may be suppressed to within a target code quantity.

Furthermore, in the above-described first and second embodiments, a description has been given about a case where the image encoding device 100 serving as an image processing device is constituted by the TotalCoefLength bit length ROM 207 serving as a variable-length-table selecting unit and a variable-length encoding unit. The present invention is not limited thereto. The image processing device of the present invention may be constituted by a variable-length-table selecting unit and a variable-length encoding unit having other various configurations.

Furthermore, in the above-described second embodiment, a description has been given about a case of calculating, by the second pre-encoding unit 2, generated code quantities based on quantization parameters QP before and after a predictive quantization parameter QP, as quantization parameters approximate to the predictive quantization parameter QP. The present invention is not limited thereto. For example, generated code quantities based on the second quantization parameters before and after the predictive quantization parameter may be calculated.

Furthermore, in the above-described second embodiment, a description has been given about a case of calculating high-precision generated code quantities of quantization parameters QP for which generated code quantities have not been calculated on the basis of a fluctuation ratio of generated code quantities based on the predictive quantization parameter and the quantization parameters QP before and after the predictive quantization parameter QP. The present invention is not limited thereto. For example, the quantizing units 28-1 and 28-*n* and the CAVLC calculating units 29-1 and 28-*n* may have a configuration of four stages or more, and high-precision generated code quantities approximate to the predictive quantization parameter QPd may be calculated on the basis of the generated code quantity obtained through simplified encoding and the code quantity ratio R_reduction.

Furthermore, in the above-described second embodiment, a description has been given about a case where the second pre-encoding unit 2 includes the simplified quantizing unit 28 and the simplified code length calculating unit 29 for executing a simplified process. The present invention is not limited thereto, and the second pre-encoding unit 2 may include at least one of them. Also, in the present invention, any of a simplified process about CAVLC and a simplified process about CABAC may be executed.

Furthermore, in the above-described first and second embodiments, a description has been given about a case where the quantization parameter QP corresponding to the high-precision generated code quantity that is the most approximate to a target generated code quantity is determined to be a basic quantization parameter $QP_{MB}$. The present invention is not limited thereto. For example, the quantization parameter QP corresponding to the high-precision generated code quantity that is the most approximate to the target generated code quantity among high-precision generated code quantities smaller than the target generated code quantity may be determined to be the basic quantization parameter $QP_{MB}$.

Furthermore, in the above-described second embodiment, a description has been given about a case where the image encoding device 200 serving as an image processing device is constituted by the first pre-encoding unit 1 and the code quantity control unit 4 serving as a predictive quantization factor determining unit, the simplified quantizing unit 28 and the CAVLC calculating unit 29 serving as a simplified encoding unit, the quantizing unit 41 and the entropy code length calculating unit 42 serving as an encoding unit, and the code quantity control unit 4 serving as a code quantity ratio calculating unit and a correcting unit. The present invention is not limited thereto, and the image processing device of the present invention may be constituted by a predictive quantization factor determining unit, a simplified encoding unit, an encoding unit, a code quantity calculating unit, and a correcting unit having other various configurations.

The invention claimed is:

1. An image processing device comprising:
a predictive quantization factor determining unit configured to determine a predictive quantization factor that is predicted to be approximate to a basic quantization factor with which a generated code quantity obtained by encoding an input image is predicted to be the most approximate to a target code quantity;
a simplified encoding unit configured to encode the input image in a simpler manner than an encoding on the basis of the predictive quantization factor and quantization factors approximate to the predictive quantization factor, thereby calculating generated code quantities obtained through simplified encoding;
an encoding unit configured to encode the input image on the basis of the predictive quantization factor, thereby calculating a generated code quantity obtained through encoding;
a code quantity ratio calculating unit configured to calculate a code quantity ratio of a generated code quantity that is calculated by the encoding unit and that is based on the predictive quantization factor to a generated code quantity that is calculated by the simplified encoding unit and that is based on the predictive quantization factor; and
a correcting unit configured to multiply the code quantity ratio by generated code quantities that are calculated by the simplified encoding unit and that are based on the quantization factors approximate to the predictive quantization factor, thereby correcting the generated code quantities based on the quantization factors approximate to the predictive quantization factor.

2. The image processing device according to claim 1, wherein the simplified encoding unit encodes the input image in a simpler manner than the encoding by performing variable-length encoding, and
wherein the encoding unit encodes the input image by using arithmetic encoding.

3. The image processing device according to claim 1, wherein the simplified encoding unit encodes the input image in a simpler manner than the encoding by using simplified variable-length encoding.

4. The image processing device according to claim 1, wherein the simplified encoding unit encodes the input image in a simpler manner than the encoding by using simplified quantization.

5. The image processing device according to claim 3, wherein, when selecting a variable-length table corresponding to an average value of encoding values on which variable-length encoding is performed in upper-adjoining and left-adjoining encoding blocks of an encoding block as an encoding target in encoding target data based on an input image that is line-scanned in units of scan blocks, each constituted by a plurality of encoding blocks, while being scanned in units of encoding blocks, each constituted by a plurality of pixels, the simplified encoding unit equates an encoding value of the upper-adjoining encoding block with an encoding value of the left-adjoining encoding block in a case where the encoding block as the encoding target is at an upper end of a scan block, thereby encoding the input image in a simpler manner than the encoding, and
wherein the encoding unit selects a variable-length table corresponding to an average value of encoding values on which variable-length encoding is performed in upper-adjoining and left-adjoining encoding blocks of an encoding block as an encoding target regardless of a position of the encoding block in the scan block.

6. The image processing device according to claim 4, wherein the simplified encoding unit includes
a multiplication coefficient supplying unit configured to store multiplication coefficients according to combinations of positions in an encoding block and quantization factors, specify multiplication coefficients available in accordance with all the quantization factors on the basis of the positions in the encoding block, and output the specified multiplication coefficients,
a plurality of multiplication coefficient selecting units configured to select multiplication coefficients according to quantization factors to be used from among the multiplication coefficients output by the multiplication coefficient supplying unit, the plurality of multiplication coefficient selecting units being provided in parallel, the number of which is the same as the number of a plurality of encoding target data items, a plurality of multiplying units configured to multiply the multiplication coefficients selected by the multiplication coefficient selecting units by a value of the encoding block, the plurality of multiplying units being provided in parallel, the number of which is the same as the number of the plurality of encoding target data items, and a plurality of shift units configured to shift the value of the encoding block multiplied by the multiplying units to the right by the number of digits according to the quantization factors, the plurality of shift units being provided in parallel, the number of which is the same as the number of the plurality of encoding target data items, wherein the multiplication coefficient supplying unit includes a first multiplication coefficient supplying unit configured to store first multiplication coefficients according to combinations of the quantization factors and the positions in the encoding block, specify first multiplication coefficients available in accordance with all the quantization parameters on the basis of the positions in the encoding block, and output the specified first multiplication coefficients, and a second multiplication coefficient supplying unit configured to store second multiplication coefficients according to combinations of quantization matrixes and the positions in the encoding block, specify second multiplication coefficients available in accordance with all the quantization matrixes on the basis of the positions in the encoding block, and output the specified second multiplication coefficients, and wherein the multiplication coefficient selecting units include a first multiplication coefficient selecting unit configured to select multiplication coefficients according to quantization parameters to be used from among the first multiplication coefficients output by the first multiplication coefficient supplying unit, and a second multiplication coefficient selecting unit configured to select multiplication coefficients according to quantization matrixes to be used from among the second multiplication coefficients output by the second multiplication coefficient supplying unit.

7. The image processing device according to claim 1, further comprising:

a calculating unit configured to calculate generated code quantities based on quantization factors other than the predictive quantization factor and the quantization factors approximate to the predictive quantization factor on the basis of a fluctuation ratio of the generated code quantities that are corrected by the correcting unit and that are based on the quantization factors approximate to the predictive quantization factor and the generated code quantity that is calculated by the encoding unit and that is based on the predictive quantization factor.

8. The image processing device according to claim 6, further comprising:

a basic quantization factor determining unit configured to determine, as the basic quantization factor, a quantization factor corresponding to a generated code quantity that is the most approximate to the target code quantity among the generated code quantity that is calculated by the encoding unit and that is based on the predictive quantization factor, the generated code quantities that are corrected by the correcting unit and that are based on the quantization factors approximate to the predictive quantization factor, and the generated code quantities that are calculated by the calculating unit and that are based on the quantization factors other than the predictive quantization factor and the quantization factors approximate to the predictive quantization factor.

9. The image processing device according to claim 7, further comprising:

a main encoding unit configured to perform main encoding on the input image on the basis of the basic quantization factor determined by the basic quantization factor determining unit.

10. An image processing method comprising:

a predictive quantization factor determining step of determining a predictive quantization factor that is predicted to be approximate to a basic quantization factor with which a generated code quantity obtained by encoding an input image is predicted to be the most approximate to a target code quantity;

a simplified encoding step of encoding the input image in a simpler manner than an encoding on the basis of the predictive quantization factor and quantization factors approximate to the predictive quantization factor, thereby calculating generated code quantities obtained through simplified encoding;

an encoding step of encoding the input image on the basis of the predictive quantization factor, thereby calculating a generated code quantity obtained through encoding;

a code quantity ratio calculating step of calculating a code quantity ratio of a generated code quantity that is calculated by the encoding unit and that is based on the predictive quantization factor to a generated code quantity that is calculated in the simplified encoding step and that is based on the predictive quantization factor; and a correcting step of multiply the code quantity ratio by generated code quantities that are calculated in the simplified encoding step and that are based on the quantization factors approximate to the predictive quantization factor, thereby correcting the generated code quantities based on the quantization factors approximate to the predictive quantization factor.

* * * * *